(12) United States Patent
Smolka et al.

(10) Patent No.: US 12,189,084 B2
(45) Date of Patent: Jan. 7, 2025

(54) LIQUID LENS HAVING A FIXED LENS SHAPING ELEMENT AND A MOVABLE TRANSPARENT WINDOW

(71) Applicant: Optotune Consumer AG, Dietikon (CH)

(72) Inventors: Stephan Smolka, Zürich (CH); Manuel Aschwanden, Allenwinden (CH); David Andreas Niederer, Küttigen (CH); Johannes Haase, Ennetboden (CH)

(73) Assignee: Optotune Consumer AG, Dietikon (CH)

( * ) Notice: Subject to any disclaimer, the term of this patent is extended or adjusted under 35 U.S.C. 154(b) by 289 days.

(21) Appl. No.: 17/787,332

(22) PCT Filed: Aug. 14, 2020

(86) PCT No.: PCT/EP2020/072933
§ 371 (c)(1),
(2) Date: Jun. 20, 2022

(87) PCT Pub. No.: WO2021/121681
PCT Pub. Date: Jun. 24, 2021

(65) Prior Publication Data
US 2023/0134656 A1    May 4, 2023

(30) Foreign Application Priority Data

Dec. 20, 2019  (EP) .................................... 19219052
Jul. 3, 2020   (EP) .................................... 20183997

(51) Int. Cl.
*G02B 1/06*      (2006.01)
*G02B 7/00*      (2021.01)
(Continued)

(52) U.S. Cl.
CPC ............... *G02B 1/06* (2013.01); *G02B 7/003* (2013.01); *G02B 7/026* (2013.01); *G02B 13/001* (2013.01);
(Continued)

(58) Field of Classification Search
CPC .......... G02B 1/06; G02B 7/003; G02B 7/026; G02B 13/001; G02B 15/06;
(Continued)

(56) References Cited

U.S. PATENT DOCUMENTS

2010/0202054 A1*  8/2010  Niederer .................. G02B 3/14
                                                        359/666
2019/0011612 A1   1/2019  Mastrangelo et al.
2019/0278102 A1   9/2019  Suter et al.

FOREIGN PATENT DOCUMENTS

CN       1720130        1/2006
CN       103180762      6/2013
(Continued)

*Primary Examiner* — James C. Jones
(74) *Attorney, Agent, or Firm* — JMB Davis Ben-David

(57) ABSTRACT

The invention relates to a liquid lens (1) with an adjustable optical power comprising at least the following components:
a lens volume (VL) with a first transparent liquid (L1) arranged between a first transparent membrane (21) and a second transparent membrane (22) opposite the first membrane (21),
wherein the first membrane (21) has a first side (21-1) facing outwards the lens volume (VL) and a second side (21-2) facing in the opposite direction particularly toward the lens volume (VL),
wherein the second membrane (22) has a first side (22-1) facing toward the lens volume (VL) and a second side (22-2) facing in the opposite direction particularly outward the lens volume (VL),
a lens shaping element (3) arranged on the first membrane (21), the lens shaping element (3) having a circumfer-
(Continued)

ential aperture (3a) defining a lens area (21a) of the first membrane (21) having an adjustable curvature, a rigid transparent window element (5) connected to the second membrane (22) covering a window portion (22a) of the second membrane (22), wherein the window element (5) is circumferentially surrounded by a free portion of the second membrane, such that the window element (5) can move relatively to the lens shaping element (3) thereby bending the free portion (22b) of the second membrane (22) and adjusting a liquid pressure in the lens volume (VL), such that a curvature of the first membrane (21) in the lens area (21a) and therefore the optical power of the lens (1) is adjusted.

20 Claims, 29 Drawing Sheets

(51) Int. Cl.
*G02B 7/02* (2021.01)
*G02B 13/00* (2006.01)
*G02B 15/06* (2006.01)
*G02B 26/08* (2006.01)
*G02B 27/64* (2006.01)

(52) U.S. Cl.
CPC ......... *G02B 15/06* (2013.01); *G02B 26/0875* (2013.01); *G02B 27/646* (2013.01)

(58) Field of Classification Search
CPC .... G02B 26/0875; G02B 27/646; G02B 3/14; G02B 13/0055; G02B 13/0075; G02B 26/004; H04N 23/687
See application file for complete search history.

(56) References Cited

FOREIGN PATENT DOCUMENTS

| | | |
|---|---|---|
| CN | 107850696 | 3/2018 |
| CN | 109073791 | 12/2018 |
| EP | 2107397 | 10/2009 |
| EP | 3495867 | 6/2019 |
| JP | H11 133210 | 5/1999 |
| JP | 2014163963 | 9/2014 |
| JP | 6120400 | 4/2017 |

* cited by examiner

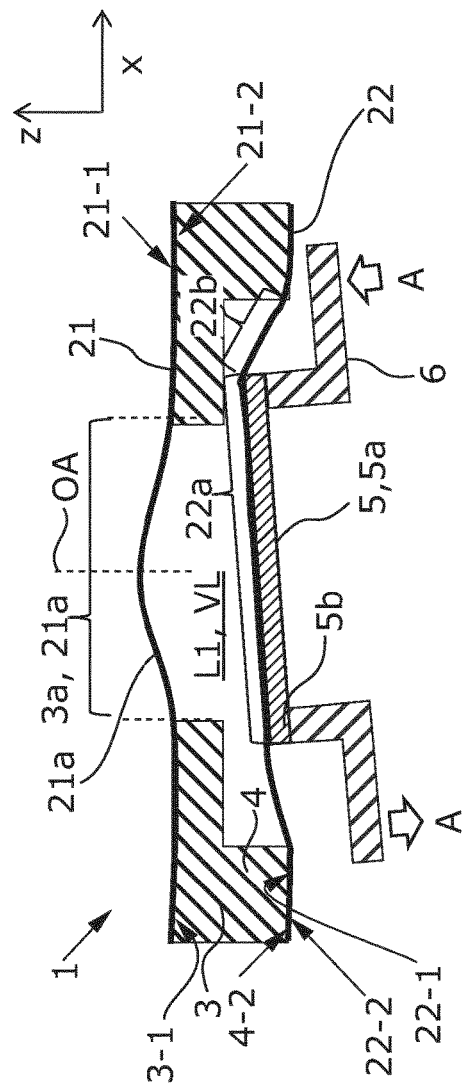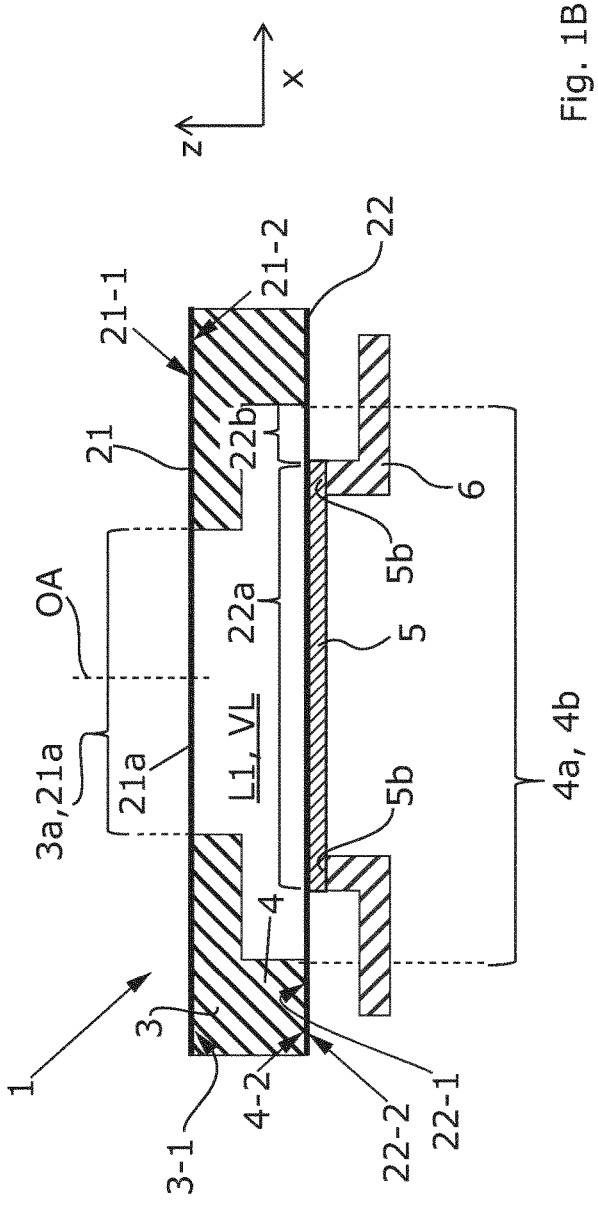

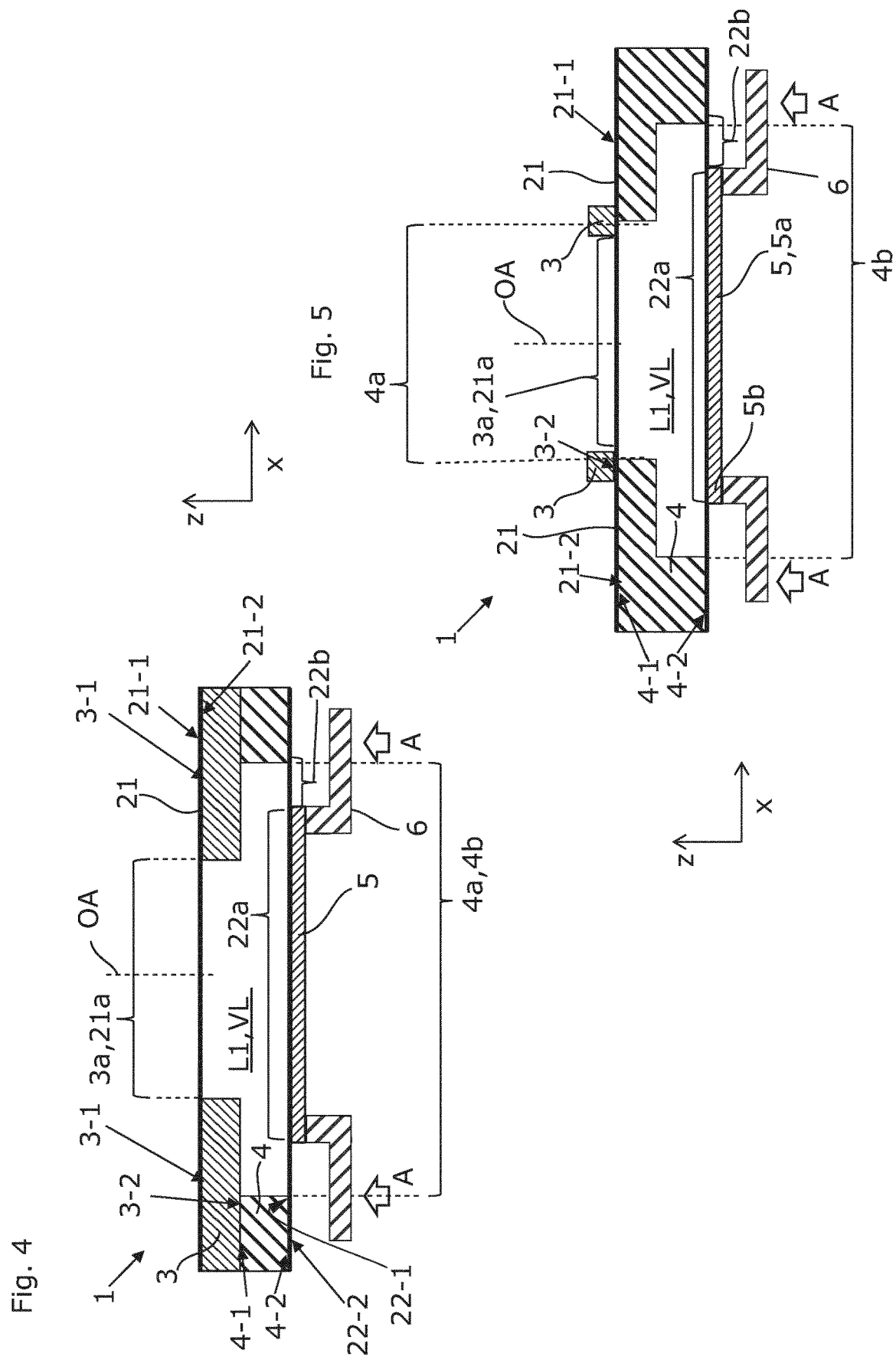

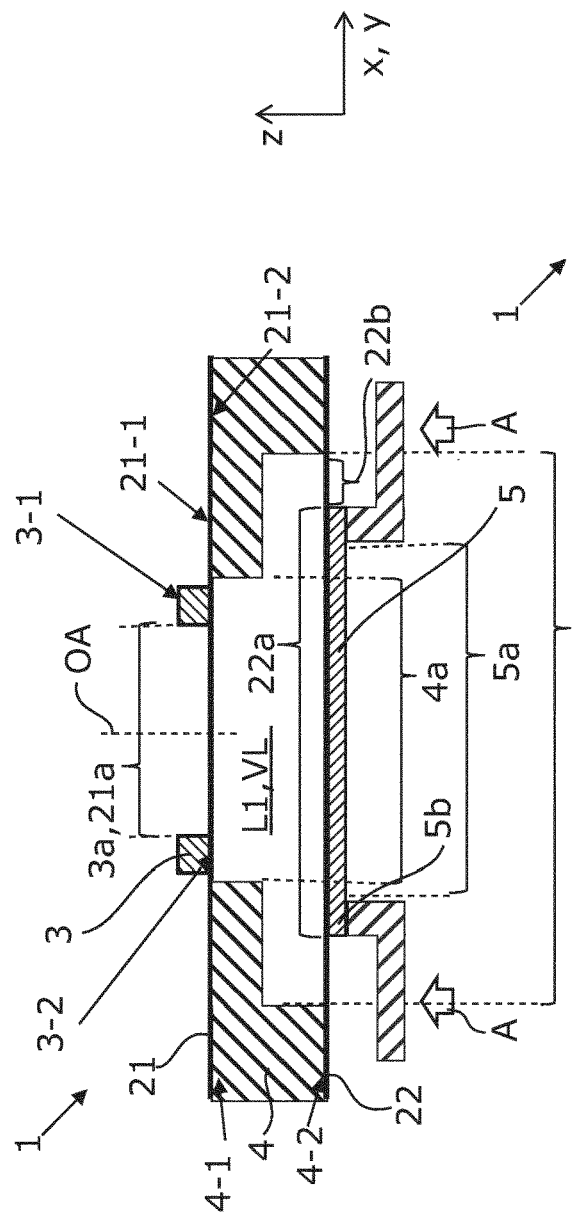
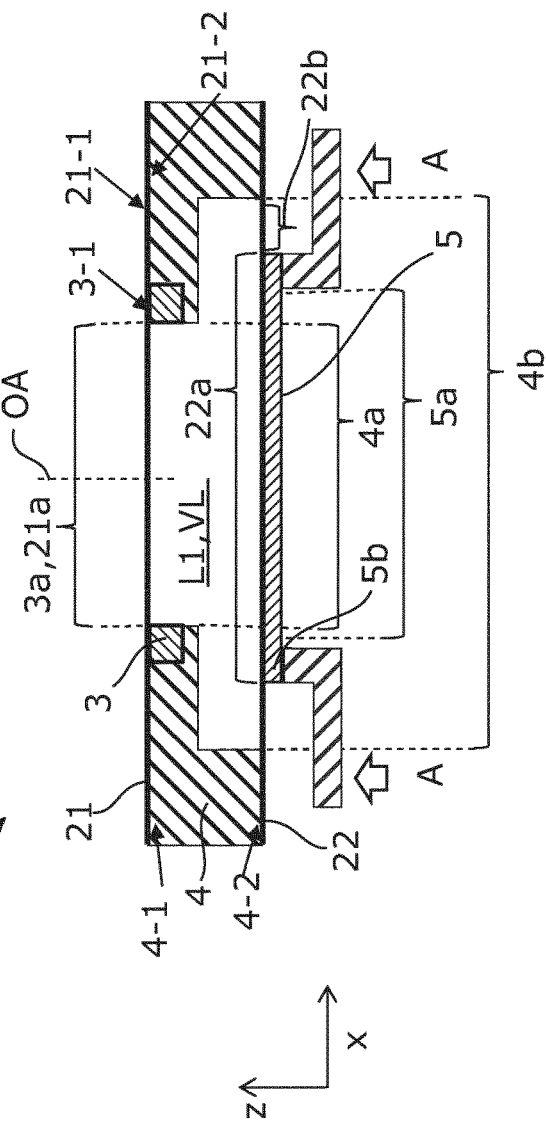
Fig. 6
Fig. 7

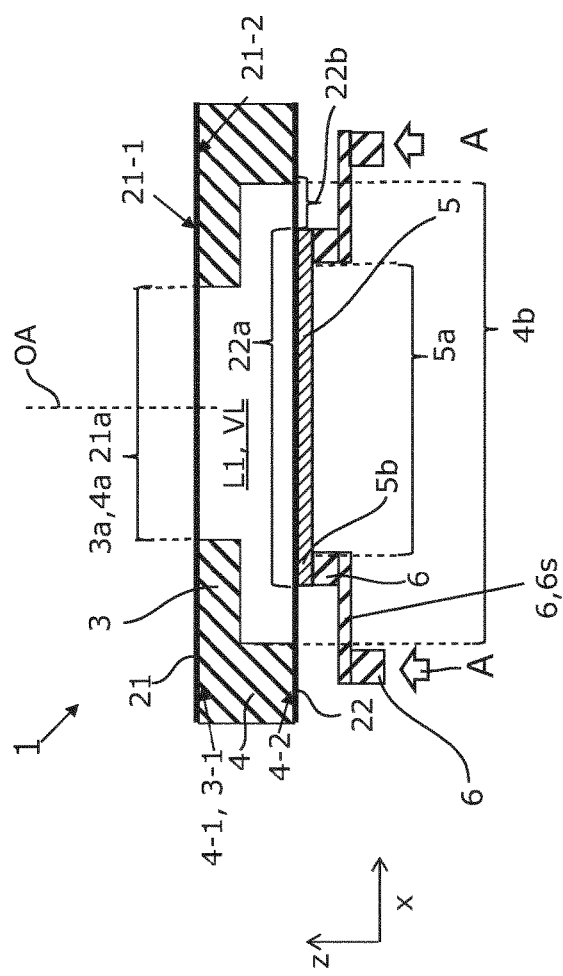
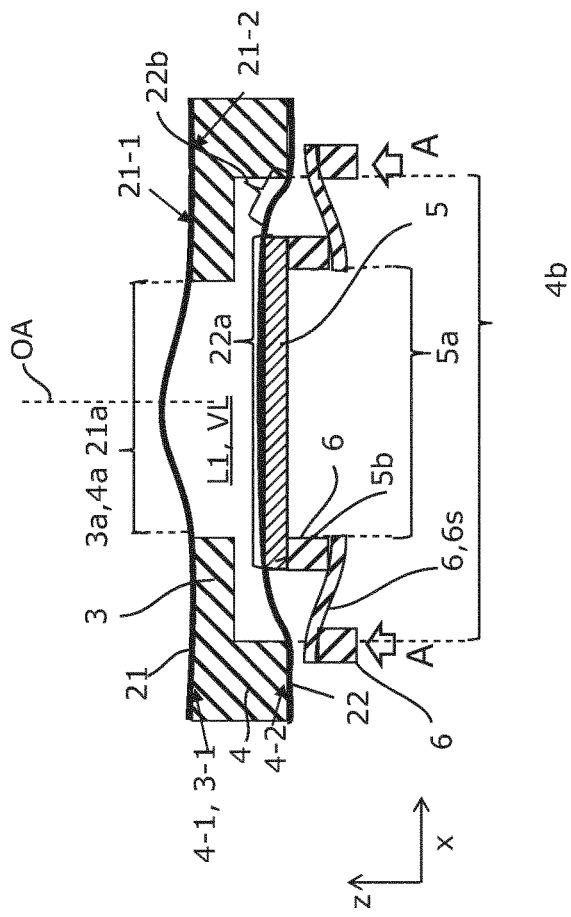
Fig. 9A
Fig. 9B

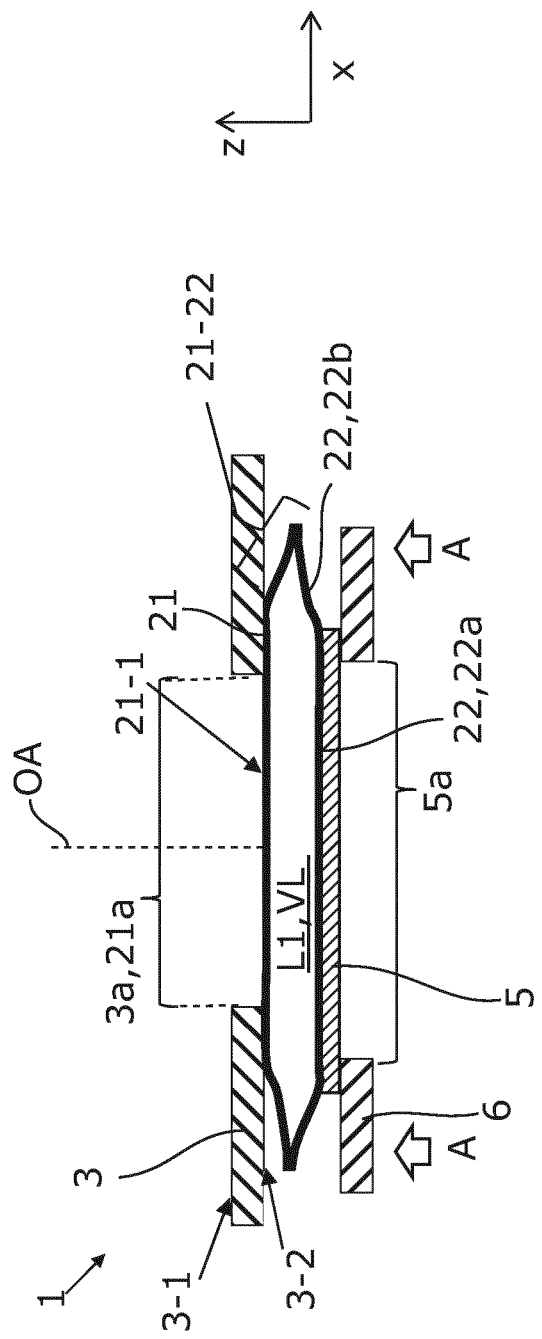

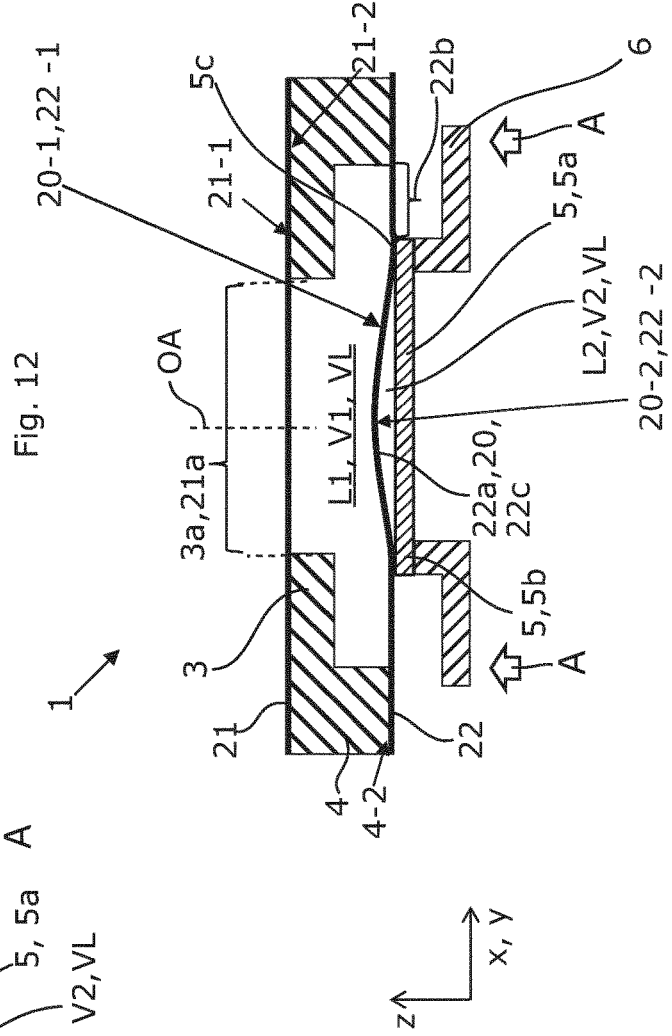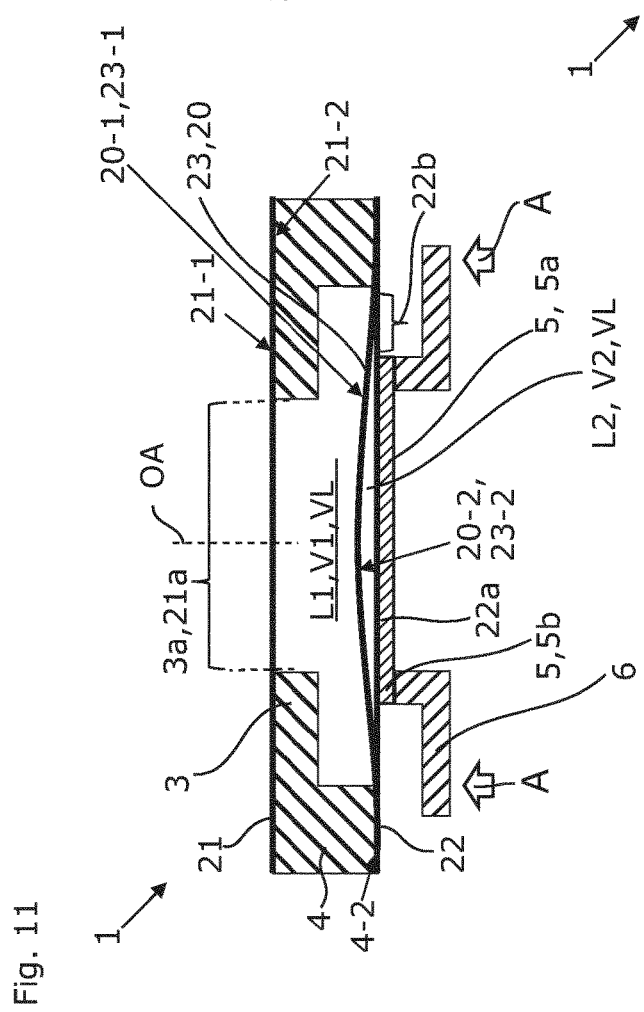

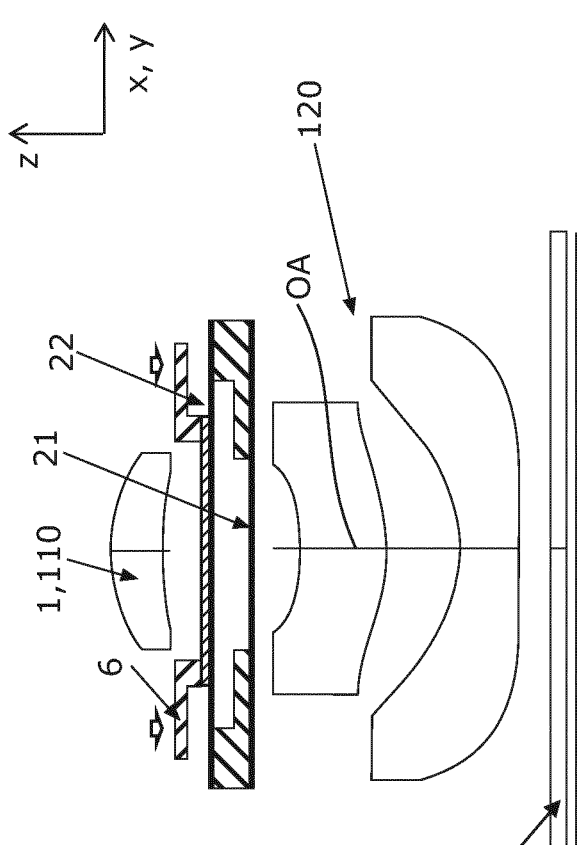
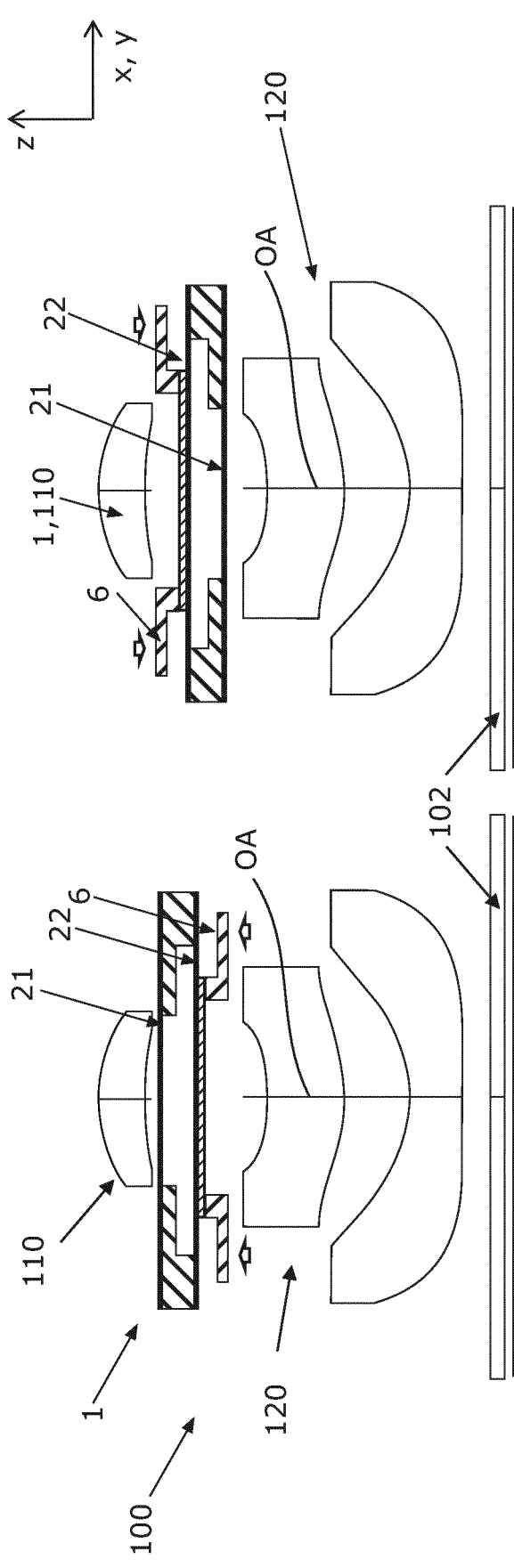

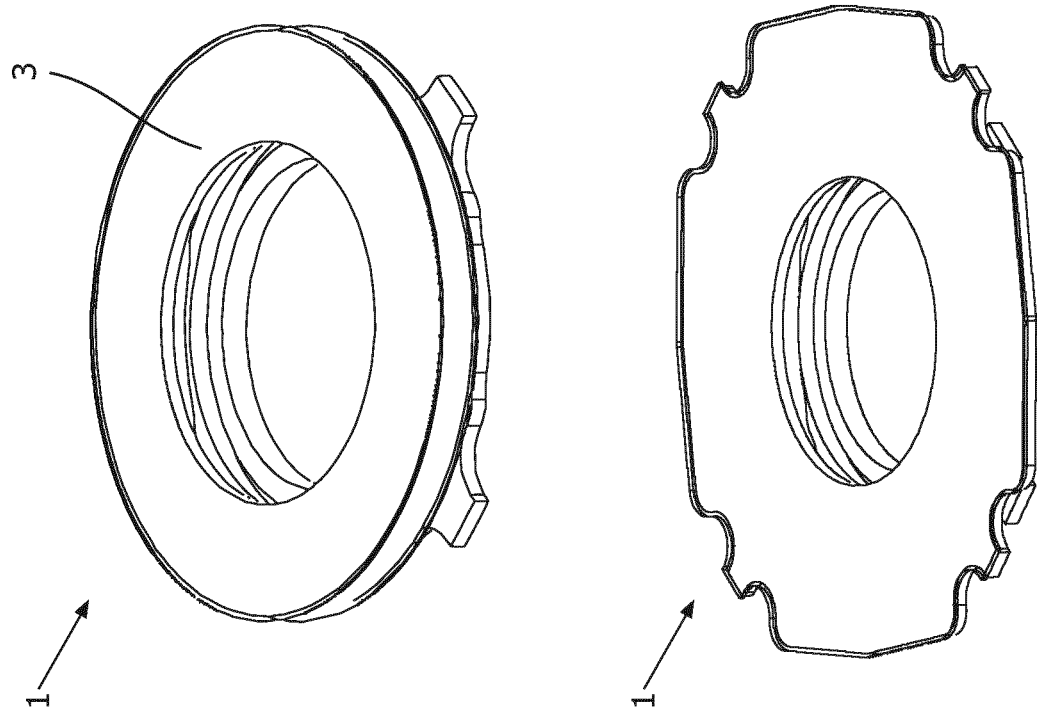
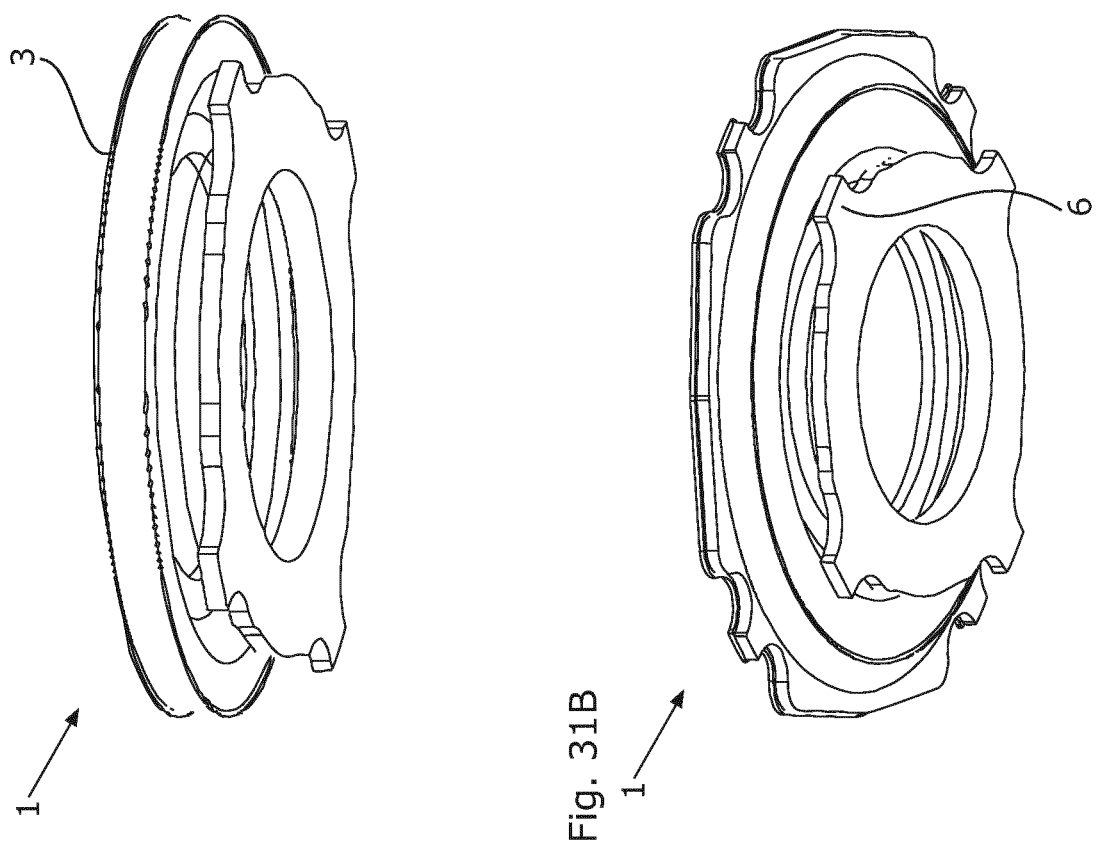
Fig. 31A
Fig. 31B

LIQUID LENS HAVING A FIXED LENS SHAPING ELEMENT AND A MOVABLE TRANSPARENT WINDOW

CROSS-REFERENCE TO RELATED APPLICATIONS

This is the U.S. National Stage of International Patent Application No. PCT/EP2020/072933 filed on Aug. 14, 2020, 2021, which claims priority to European Patent application Ser. No. 19/219,052.8 filed on Dec. 20, 2019, and European Patent Application No. 20183997.4 filed on Jul. 3, 2020.

The invention relates to a liquid lens, an optical system and a method for controlling the lens or the system.

In the art membrane-based liquid lenses are known. The lenses operate on a mechanical force applied to an incompressible liquid in a lens volume, wherein in response to the applied force a membrane covering the lens volume adjusts its curvature and thus the optical power of the lens.

For this purpose, the liquid lens has a first membrane and opposite the first membrane a rigid transparent cover element, wherein the liquid is arranged between the membrane and the cover element.

The lens further comprises a wall portion enclosing the liquid circumferentially. The first membrane may be connected to the wall portion.

The actuation force is provided to the liquid lens by means of a movable lens shaping element. The lens shaping element is outside of the lens volume arranged on the first membrane and comprises an aperture that defines an adjustable lens area of the first membrane within which the first membrane can adjust its curvature along the optical axis upon actuation. Around the aperture of the lens shaping element there is a free membrane portion of the first membrane allowing the membrane to bend and provide the necessary elasticity for actuation.

By moving the lens shaping element towards or away from the lens volume the curvature of the first membrane is adjusted.

This design has several disadvantages.

For example during assembly of the lens, an optical axis of the lens is defined by the lateral wall. The lens shaping element with its aperture therefore needs to be arranged perfectly centered on the optical axis in order to omit aberrations and beam displacements relative to the optical axis.

Moreover, when actuating the lens shaping element along the optical axis of the lens, residual lateral movement of the lens shaping element cannot be prevented. These lateral movements however lead to movement of the optical axis of the adjustable lens area of the membrane and also a potentially asymmetric membrane curvature with respect to the optical axis of the lens. This leads to undesired lateral image shifts when the optical power of the lens is adjusted.

Furthermore, the lens does not provide means for compensating or controlling a beam displacement.

Also, the first membrane has to provide a specific stiffness such that the desired optical properties of the lens can be achieved. For actuation however, it is more desirable to have a low stiffness which allows for low actuation forces and thus energy conserving control of the lens. This leads to a conflict of objectives in the lens design that cannot be solved without compromise.

In general the lenses known in the art require a certain predefined building space, which for many applications should be reduced.

An object of the present invention is to provide a lens that solves the problems of the lenses known in the art. The object is achieved by the liquid lens having the features of claim 1.

Advantageous embodiments are described in the sub-claims.

According to claim 1 the liquid lens has an adjustable optical power and comprises at least the following components:

a lens volume with a first transparent liquid arranged between a first transparent, particularly elastically deformable, membrane and a second transparent, particularly elastically deformable, membrane opposite the first membrane, wherein the first membrane has a first side facing outwards the lens volume and a second side facing in the opposite direction toward the lens volume, wherein the second membrane has a first side facing toward the lens volume and a second side facing in the opposite direction outward the lens volume, a lens shaping element arranged on, particularly connected to, more particularly fixedly connected to the first membrane, the lens shaping element having a circumferential aperture defining a lens area of the first membrane having an adjustable curvature, a transparent, particularly rigid and/or massive window element connected to the second membrane, particularly wherein the window element is particularly fixedly connected to the second side of the second membrane, covering a window portion of the second membrane, wherein the window element is circumferentially surrounded by a free, particularly non-window covered portion of the second membrane, such that the window element can move relatively to the lens shaping element thereby bending the free portion of the second membrane and adjusting a liquid pressure in the lens volume, such that a curvature of the first membrane in the lens area and therefore the optical power of the lens is adjusted.

According to an embodiment of the invention, an optical path extends through the window element and the lens area of the first membrane along the optical axis.

The term "optical path" particularly defines the portion of the lens, particularly the portion of the lens volume through which light propagates for being affected by the lens, i.e. the optical path does particularly not include residual stray light that might propagate through the lens in a manner that is not contributing to the intended alteration of the wave front of the light propagating through the lens.

The clear aperture of the lens shaping element defines the lens area of the first membrane by means of the circumferential enclosure of said lens area. When a pressure in the lens volume is adjusted, the lens area of the first membrane may alter its curvature in response to the pressure in the lens volume by either adopting a convex shape, i.e. in an outward protruding fashion, or by adopting a concave shape, i.e. in an inward protruding fashion. The change of curvature of the lens area of the first membrane allows the lens to adjust its optical power in a well-defined manner. Depending on the embodiment, the first membrane may also alter its curvature at other portions outside the lens area, however, these portion are outside the optical path of the lens and do not contribute to the optical properties of the lens.

According to another embodiment of the invention, in response to a change of pressure in the lens volume, the curvature of the first membrane causing the lens to change its optical power takes place only in the lens area of the first membrane.

Such change in pressure may be evoked by a relative movement or tilt of the window element toward or away from the lens shaping element.

The window element may be a plate-like window with no holes having at least one planar surface that is connected to the second side of the second membrane.

According to another embodiment of the invention, the lens comprises a lens body, wherein the lens body comprises at least the lens shaping element, the first membrane, the second membrane as well as the lens volume.

According to another embodiment of the invention, the lens shaping element is a fixed component of the lens body. Therefore, adjustment of the optical power or prism of the lens may be facilitated by moving the window element relatively to the lens body.

In a first embodiment, adjustment of the optical power and/or prism of the lens can be facilitated by means of an actuation force, for example provided by an actuator, configured to move the window element towards or away from the lens shaping element and thus the lens body, particularly while the lens body and the lens shaping element remain at a fixed position. In a second embodiment, adjustment of the optical power and/or prism of the lens may be facilitated by means of an actuation force, for example provided by an actuator, configured to move the lens body and/or the lens shaping element towards or away from the window element, particularly while the window element remains at a fixed position. Both embodiments provide a relative movement of the window element with respect to the lens shaping element and/or the lens body.

In other words, particularly, the optical power and/or prism of the lens may be adjusted by applying an actuation force to the lens shaping element, the window element or the lens body. The actuation force results in a relative motion of the window element and the lens shaping element. Said motion results in a displacement of the liquid in the lens volume, whereby the curvature of the first membrane in the lens area and/or the tilt of the first membrane in the lens area with respect to the window element is altered.

According to another embodiment of the invention, the lens comprises a housing, wherein the lens shaping element is rigidly, i.e. non-movable connected to the housing, wherein the window element is not connected to the housing or movably connected to the housing.

According to another embodiment of the invention, upon actuation, the housing is moved relatively to the window element, either by actuating the window element with respect to the fixed housing and/or by actuating the housing with respect to the fixed window element. The window element may be fixed to a holding device of the lens.

Even if the window element exhibits residual lateral movement relative to the lens body or housing upon actuation, the optical quality of the lens remains unaffected as the optical axis and the shape of curvature in the lens area is unaltered.

Moreover, actuation is not moving the lens shaping element relative to the lens body or housing which provides greater robustness and freedom of choice regarding the first and the second membrane.

Furthermore, impact of assembly tolerances on the position of the optical axis is reduced, because the position of the optical axis is essentially defined by the positon of the aperture of the lens shaping element.

Positioning tolerances of the window element on the second membrane do not affect the optical quality of the lens.

According to one embodiment, the lens comprises a prism function for deflecting a light beam relative to the optical axis of the lens. The prism function can be addressed by tilting the window element relative to the aperture of the lens shaping element.

According to an embodiment of the invention, the window element is formed as a planar plate.

According to an embodiment of the invention, the window element has a first planar surface that is fixedly connected, i.e. attached to the second membrane and a second surface that is facing in the opposite direction of the first planar surface.

According to an embodiment of the invention, the second surface of the window element is planar. In this case the window may introduce a prism capability but no optical power to the lens.

According to another embodiment of the invention, the first or the second surface of the window element is curved. In this case, the window element provides some additional optical power to the lens. In particular, the window element is a rigid lens, having a predefined optical power.

According to an embodiment of the invention, a z-axis of a Cartesian or cylindrical coordinate system extends orthogonally through the aperture of the lens shaping element.

According to an embodiment of the invention, an x-axis and a y-axis of a Cartesian coordinate system extend parallel to the aperture of the lens shaping element.

According to an embodiment of the invention, an optical axis of the lens extends orthogonally through the center of the aperture of the lens shaping element.

Depending on the physical requirement of the lens the relative sizes of the aperture and the second opening can be chosen.

The size of second opening essentially defines a stroke or force necessary for actuation of the window element, more precisely the actuation force and stroke depends on the size of the window element and the free portion of the second membrane as well as the stiffness of the second membrane.

It is noted that the actuation element is also referred to as piston shaper in the context of the specification.

It is further noted that the lens shaping element is also referred to as lens shaper in the context of the specification.

It is noted that the lens area does not need to be circular, but can have various shapes, such as oval, rectangular or polygonal.

It is further noted that the term deflection unit particularly refers to the lens area of the first membrane and to the lens shaping element in the context of the specification.

It is further noted that the term "container" particularly refers to the wall portion (see further below for details on the wall portion) with or without the lens shaping element in the context of the specification.

The lens shaping element may be also referred to as lens shaper in the context of the current specification.

With the lens according to the invention, either the window element might be actively moved with respect to a fixedly arranged lens shaping element or the fixedly arranged lens body. Movement of the window element might be facilitated with an actuator in order to adjust the optical power or the prism of the lens.

Alternatively, the lens body comprising the lens shaping element as well as the first and second membrane might be actively moved with respect to a fixedly arranged window element. Movement of the lens body, or the lens shaping element might be facilitated with an actuator in order to adjust the optical power or the prism of the lens.

It is noted that a movement of the lens shaping element alone, e.g. with respect to the first and the second membrane is not possible according to the invention, as the relation of the lens shaping element fixed with respect to the first membrane and the second membrane, particularly with respect to the lens body. This allows for the provision of a more robust lens with improved actuation properties as compared to liquid lenses where the lens shaping element is moved separately and relative to the lens body, e.g. the first membrane and the second membrane, and where the window element is in a fixed relation with respect to the lens body.

It is further noted, the relative movement of the window element with respect to the lens shaping element might be alternatively or additionally defined, if the lens comprises a wall portion, which disclosed for some embodiments of the invention. The relative movement in embodiments that have the wall portion may be defined by the window element being movable relative to the wall portion, wherein the lens shaping element remains at a fixed location and orientation with respect to the wall portion. The wall portion can be considered as being part of the lens body.

In the art, the lens shaping element is always moving relative to the wall portion.

In some embodiments the lens has an extension along the optical axis between 100 μm and 2 mm.

In some embodiments, the lens shaping element has an extension along the optical axis between 25 μm and 200 μm, particularly 100 μm.

In some embodiments, the window element has an extension along the optical axis between 50 μm and 200 μm, particularly 150 μm.

According to another embodiment of the invention, the lens volume is enclosed particularly exclusively, by the first and the second membrane only, wherein the first and the second membrane are connected in a sealing fashion to each other such as to form the lens volume, particularly wherein the first membrane and the second membrane are connected circumferentially at a lateral portion of the lens volume, particularly wherein the lateral portion extends circumferentially around the lens area of the first membrane and circumferentially around the free portion of the second membrane.

This embodiment provides a cushion-like lens, with no wall portion or rigid elements that might provide additional stability to the lens volume. This embodiment is therefore particularly light-weight and less-complex to manufacture.

Particularly, the lens shaping element is arranged between the lens area of the first membrane and the lateral portion.

This embodiment might also include a housing for rigid attachment of the lens shaping element, such that a motion of the window element relative to the lens shaping element does not cause the lens shaping element to move as well, such that actuation is not taking place efficiently.

According to another embodiment of the invention, the first membrane and the second membrane are integrally formed in form of a membrane sleeve that is sealingly connected at the openings of the membrane sleeve, particularly at the circumferential portion of the lens.

This embodiment allows for an even more facile manufacturing and provides a shorter seam length which in turn results in a more stable and robust lens.

The term sleeve in the context of the current specification particularly refers to a cylindrical or morphologically equivalent or similar geometry of a cylinder, wherein a cylinder wall is formed by the membrane that integrally comprises the first membrane and the second membrane. In other words, the membrane sleeve is a tube shaped membrane.

At the openings of the sleeve, the membrane is sealed in comprises the liquid of the lens.

According to another embodiment of the invention, the lens volume forms or comprises a first volume comprising the first liquid.

This embodiment allows for various types of lenses. According to a first alternative, the lens comprises only one liquid, namely the first liquid and the lens volume is the first volume. According to a second alternative, the lens comprises a plurality, for example two liquids that are both comprised in the lens volume, wherein the first liquid is comprised in the first volume and the other liquids are comprised in other (sub)-volumes of the lens volume. That is the lens volume might comprise a plurality of sub-volumes, when the lens comprises more than one liquid, wherein the first volume may be considered as a sub-volume of the lens volume as well.

According to another embodiment of the invention, the lens comprises a second liquid in a second volume, wherein the second volume is arranged at least partially on and/or completely centered around the optical axis of the lens, particularly along the z-axis of the lens, wherein the first liquid and the second liquid as well as the first volume and the second volume are separated from each other by a separating membrane portion.

The embodiment allows for acceleration-induced optical aberration compensation that for example occurs due to gravity.

By appropriately choosing the physical properties of the first and the second liquid acceleration-induced optical aberration compensation can be achieved.

Acceleration-induced optical aberrations may also be introduced by any force that attacks the lens obliquely to the optical axis.

According to this embodiment, the first and the second volume are essentially stacked on each other along the optical axis of the lens and are extending circumferentially around the optical axis of the lens.

The separating membrane portion may be a third membrane or it may be a particularly integral portion of the second membrane that is arranged such that it separates the first from the second volume. The latter is for example possible in case the second volume is arranged between a portion of the second membrane and the window element, wherein the second volume is sealed between said portion of the second membrane and the window element.

The first and the second volume are separated by each other in a liquid tight fashion, such that the liquids in the first and the second volume cannot exchange. It is noted that the membrane portion is not a liquid interface of the first and the second liquid but is made from a different material than the liquids.

According to another embodiment of the invention, the second liquid is arranged and sealed between the window element and the second membrane. In particular, the second membrane is connected with its second side only at a circumferential portion of the window element with the window element, thereby enclosing the second liquid between an integral portion of the second membrane and the window element, particularly wherein said integral portion forms the separating membrane portion, particularly wherein the separating membrane portion is in contact with the second liquid with a second side that corresponds to the second side of the second membrane and with the first liquid with a first side that corresponds to the first side of the second membrane.

Advantageously, this embodiment requires no third membrane and is thus less complex and more robust.

Moreover, upon actuation the second volume remains essentially at the same size and the integral portion of the second membrane (i.e. the separating membrane portion) does not change size which allows for low actuation forces, particularly as only the free portion of the second membrane and the lens area of the first membrane have to be changed in shape by a pressure change in the lens volume.

Particularly, the circumferential portion of the window element has a larger size than the clear aperture of the lens, particularly the clear aperture of the lens shaping element. Advantageously, the acceleration-dependent aberration compensation happens over the entirety of the clear aperture of the lens. In case the lens has a circular aperture, the circumferential portion of the second membrane surrounding the window element has a larger diameter than the clear aperture of the lens shaping element. In an analogue manner, this can be applied for different shapes of the clear aperture of the lens, particularly the clear aperture of the lens shaping element.

According to another embodiment of the invention, the separating membrane portion is comprised, particularly formed, more particularly integrally formed by a third membrane, wherein the third membrane has a first side and a second side, wherein the second side of the third membrane faces in the opposite direction than the first side of the third membrane.

This embodiment allows for a more differentiated structure of the lens volume in terms of separating the first from the second volume. For example, the third membrane may be attached to components of the lens, such as a wall portion, the first and/or the second membrane.

According to another embodiment of the invention, the first liquid is arranged between the first membrane and the third membrane. According to this embodiment, the first and the third membrane completely or partially limit the first volume. The third membrane may be attached to the first membrane such that the first volume is delimited by the first and third membrane only. For the perspective of manufacturing such a lens, there are several methods of producing such membrane-only first volume in conjunction with the second volume that might be formed as well from membranes only, e.g. by the first and the second membrane.

It is noted that all membranes are not solely liquid interfaces of the first and the second liquid but are made of a different materials than the liquids.

According to another embodiment of the invention, the second liquid, and thus the second volume is arranged between the third membrane and the second membrane. This embodiment complements for example the previous embodiment, where the first volume is arranged between the first and the third membrane.

Particularly, the lens volume is comprised between the first and the second membrane, wherein the third membrane is ranged inside the lens volume.

According to another embodiment of the invention, the second volume is comprised by the lens volume.

This embodiment is a clarification of the terms used in the specification.

According to another embodiment of the invention, the second volume is enclosed, particularly completely formed and enclosed by the third membrane and the second membrane. This embodiment might be used in combination with other embodiments to form a cushion-like lens which lens volume is essentially formed by membranes only.

According to another embodiment of the invention, the third membrane is circumferentially connected with its second side to the first side of the second membrane, particularly wherein the second volume with the second liquid is formed between a portion, particularly the window portion of the second membrane and a portion of the third membrane.

According to this embodiment, for example the second membrane is attached with its second side over an entire side of the window element to the window element and with the first side the second membrane faces the second volume. The third membrane in turn faces the second volume with its second side and with its first side the third membrane might face the first volume. Particularly, at some rim portions of the second and the third membrane, the membranes might be attached and sealingly connected to each other so as to form the second volume.

According to another embodiment of the invention, the third membrane is connected to the lens shaping element.

According to another embodiment of the invention, the first membrane is connected to the first side of the lens shaping element and wherein the third membrane is connected to the second side of the lens shaping element, such that the first volume is enclosed in the aperture of the lens shaping element.

This embodiment provides lateral structural stability to the first volume and the physical properties of the lens may be defined more precisely. Moreover, according to this embodiment, upon actuation both, the first and the third membrane (as well as the free portion of the second membrane) will be forced to change their curvature. This allows for additional optical power adjustment by the third membrane by exploiting changes in refractive index between the first and the second liquid. According to this embodiment, the curvature of the first and the third membrane will be either both convex or both concave. As both membranes are attached to the lens shaping element they exhibit the same clear aperture such that the clear aperture is perfectly overlapping and identical for both membranes, which allows for a high optical performance lens. The curvature of the first and the third membrane are moreover independent of a potential tilt of the window element and thus completely defined by the pressure change in the lens upon actuation and the clear aperture of the lens shaping element, which, to contributes to a high-quality lens. The actuation forces required for this embodiment are comparably higher, as according to this embodiment, three membranes have to be bent upon actuation (as compared to embodiments, where only two membranes, namely the first and the second membrane are bent).

According to another embodiment of the invention, the third membrane is circumferentially connected to the first membrane and the first volume is formed between the first membrane and the third membrane, particularly wherein the first side of the third membrane is in contact with the first liquid and the second side of the third membrane is in contact with the second liquid. Particularly, the first volume is formed by the first and the third membrane only.

According to this embodiment, actuation forces may be comparably low, as the third membrane is exposed only to very minor bending forces.

According to another embodiment of the invention, the third membrane is connected with its first side to the second side of the first membrane.

According to another embodiment of the invention, the first liquid has a first refractive index n1 and the second liquid has a second refractive index n2, wherein the first and the second refractive index are different from each other.

This allows for various problems of the lens to be overcome.

One problem that may be solved with the two liquids having different refractive indices is temperature compensation of the optical power of the liquid lens.

According to another embodiment of the invention, the first liquid and the second liquid have different refractive indices, and the materials of the first liquid and the second liquid, the curvature of the membranes delimiting the first volume and the second volume are selected such that temperature-induced changes of the volume of the first and second liquid and temperature-induced changes of the refractive indices of the first and the second liquid are compensated, whereby the optical power of the lens remains essentially constant over a range of different temperatures.

For example, the first liquid may have a refractive index of 1.3±0.05 and the second liquid may have a refractive index of 1.45±0.05. Both, the first and the second liquid expand, when the temperature increases. Thereby, the curvatures of the membranes delimiting the first volume and the second volume respectively change in a similar fashion, when the temperature increases. Advantageously, a lens comprising two liquids with different refractive indices enables inherent temperature compensation, which results in a particularly reliable performance of the lens.

With differing refractive indices of the two liquids also acceleration-induced aberrations may be compensated or eliminated.

According to another embodiment of the invention, the first liquid has a first mass density and a first refractive index and the second liquid has second mass density and a second refractive index, wherein the first and the second refractive indices of the first and the second liquid as well as the first and the second mass densities are selected such that an acceleration-induced aberration of the lens, such as gravity-induced aberration, such as gravity coma or posture effects induced by orienting the lens along different directions with respect to gravity is compensated.

The person skilled in the art will understand that certain combinations of mass densities and refractive indices will behave just so that the optical path is adjusted by the two liquids such that said aberrations are compensated.

According to another embodiment of the invention, the second mass density of the second liquid is higher than the first mass density of the first liquid, and the second refractive index is smaller than the first refractive index of the first liquid or vice versa.

Such a combination of the physical properties of the liquids allows for acceleration-induced aberration compensation or at least reduction.

According to another embodiment of the invention, the first membrane has a first stiffness and the separating membrane portion, particularly the third membrane has a separating membrane portion stiffness, particularly wherein a thickness of the first membrane and the thickness of the separating membrane portion are essentially equal, wherein the first stiffness and the separating membrane portion stiffness are selected according to the relation $$\frac{k_s}{k_1} = \frac{n_1 - n_2}{n_1 - 1} \frac{\rho_2 - \rho_1}{\rho_1}$$

wherein $\rho_1$ is the first mass density of the first liquid, $\rho_2$ is the second mass density of the second liquid, $n_1$ is the first refractive index of the first liquid and $n_2$ is the second refractive index of the second liquid.

According to another embodiment of the invention, the first membrane has a first thickness $t_1$ and the separating membrane portion has separating membrane portion thickness $t_s$, particularly wherein a stiffness of the first membrane and a stiffness of the separating membrane portion are essentially equal, wherein the first thickness and the separating membrane thickness are selected according to the relation:

$$\frac{t_s}{t_1} = \frac{n_1 - 1}{n_1 - n_2} \frac{\rho_2 - \rho_1}{\rho_1},$$

wherein $\rho_1$ is the first mass density of the first liquid, $\rho_2$ is the second mass density of the second liquid, $n_1$ is the first refractive index of the first liquid and $n_2$ is the second refractive index of the second liquid.

According to another embodiment of the invention, the stiffness of the first membrane and/or the stiffness of the separating membrane portion is/are in the range of 0.1 MPa and 10 MPa.

In this range one the one hand actuation forces are manageable and on the other hand membranes are rendered robust enough to last for a long time.

According to another embodiment of the invention, the membrane thickness of the first membrane and/or the thickness of the separating membrane portion is/are in the range of 2 μm and 200 μm.

This thickness range allows for a robust membrane and moderate actuation forces.

According to another embodiment of the invention, the first and/or the second refractive index is/are in the range of 1.26 and 1.6. Particularly, the first refractive index of the first liquid is in the range 1.3±0.05 and the second refractive index of the second liquid is in the range of 1.45±0.05.

According to another embodiment of the invention, the first and/or the second mass density is/are in the range of 1 kg*m$^{-3}$ and 1.8 kg*m$^{-3}$.

According to another embodiment of the invention, the lens comprises an actuation element connected to the window element. Particularly the actuation element serves as a connection device for an actuation device. As such the actuation element may be integrally formed, glued to, or welded with the window element.

In some embodiments, the actuation element has an extension along the optical axis between 50 μm and 200 μm, particularly 100 μm.

The actuation element may have a clear aperture centered around the optical axis or may be asymmetrically formed with respect to the optical axis.

The actuation element may be formed from a different material than the window element or from the same material. The window element can be formed from glass or a transparent polymer.

According to another embodiment of the invention, the actuation element is connected, particularly in a rigid fashion to the window element at a circumferential portion of the window element, such that the window element can be tilted by the actuation element around at least one axis with respect to the aperture of the lens shaping element and/or translationally moved towards or away from the aperture of the lens shaping element.

Tilting of the window element may be achieved by providing an asymmetric force to the actuation element with respect to the optical axis of the lens. Tilting of the window element may be used in order to provide a prism function to the lens Translation in turn may be achieved by providing a symmetric force to the actuation element. Translation of the window element along the optical axis may be used to adjust the optical power of the lens, as at least the curvature of the lens area of the first membrane is adjusted by such a translational motion of the window element.

According to another embodiment of the invention, the actuation element has a clear aperture enclosed by the actuation element such that light can pass through the clear aperture of the actuation element and through the window element. The clear aperture may be centered around the optical axis of the lens. Particularly, the clear aperture of the actuation element may be larger than the clear aperture of the lens shaping element.

According to another embodiment of the invention, the actuation element comprises a rigid portion and at least one damping element, wherein the damping element may be arranged at least partially between the window element and the rigid portion of actuation element, and/or wherein the damping element may be arranged at an outer portion of the rigid portion of the actuation element, wherein the damping element is softer than the window element and the rigid portion of the actuation element, pa wherein the damping element is connected to the window element, particularly at the circumferential portion of the window element.

The damping element for example allows for larger strokes for actuating the window element, which in turn allows for the use of a different kind of actuators that might be more cost-effective, due to reduced actuation-accuracy requirements.

Also the damping elements absorb external shocks.

According to another embodiment of the invention, the actuation element comprises a spring element such that an actuation force provided to the window element is transmitted via the spring element, particularly wherein the spring element is formed as an elastic metal sheet that extends essentially parallel to the window element.

The spring element particularly allows for larger strokes of the actuator, which leads to an increased actuation accuracy and tolerance and the manufacturing of the lens with less expensive actuators.

Moreover, the spring element may serve as an absorber for mechanical shocks.

According to another embodiment of the invention, the circumferential portion of the window element at which the actuation element is connected has a larger diameter, particularly a larger clear aperture than the aperture of the lens shaping element, particularly larger than the first opening of the wall portion (see further below), such that an optical path through the lens remains unobstructed by the actuation element, particularly wherein the diameter, particularly the clear aperture of the circumferential portion of the window element is so large that the optical path remains unobstructed by the actuation element, even if the actuation element is tilted with respect to the aperture of the lens shaping element.

When the apertures are circular the term diameter relates directly to the diameter of the circular aperture. If another shape of aperture is chosen for the lens, the aperture of the actuation element has to be so large that the actuation element does not obstruct the optical path through the clear aperture of the lens shaping element.

According to another embodiment of the invention, the lens shaping element is arranged fixed in space, while the window element is movably arrange din space, particularly wherein the lens shaping element is arranged fixedly at an external system or a housing or an optical system with respect to the movable window element, such that adjusting an optical power of the lens is facilitated by moving the window element relative to the lens shaping element that remains fixed in space, e.g. fixed relative to the external system, the housing or the optical system.

This embodiment essentially relates to a window element that is moved by an actuator.

Movement of the window element may comprise a tilting motion and/or a translational motion particularly parallel to or along the optical axis.

According to another embodiment of the invention, the lens body comprising the lens shaping element is configured to be actuated or moved, wherein the window element is fixedly arranged in space, while the lens body is arranged movably in space, wherein the window element may be rigidly connected to a housing of the lens, to an external system or to an optical system, such that adjusting an optical power or prism of the lens is facilitated by moving the lens body relative to the window element that remains fixed in space, e.g. fixed relative to the external system, the housing or the optical system.

According to another embodiment of the invention, the window element is configured to be actuated or moved, wherein the lens body, comprising the lens shaping element is fixedly arranged in space, while the window element is arranged movably in space, wherein the lens body and thus the lens shaping element may be rigidly connected to a housing of the lens, to an external system or to an optical system, such that adjusting an optical power of the lens is facilitated by moving the window element relative to the lens body that remains fixed in space, e.g. fixed relative to the external system, the housing or the optical system.

According to another embodiment of the invention, the lens comprises a lateral wall portion, particularly a rigid lateral wall portion extending circumferentially around the lens volume, particularly enclosing the lens volume at least laterally and/or radially, wherein the wall portion has a first side with a first opening facing toward the first membrane and a second side with a second opening opposite the first opening, wherein the second opening extends circumferentially around the free portion of the second membrane, particularly wherein the second side of the wall portion is connected, particularly bonded, plasma-bonded or glued, to the first side of the second membrane, thereby particularly sealing the first liquid in the lens volume, particularly wherein the lens shaping element is arranged at a fixed orientation and position with respect to the wall portion.

The wall portion is comprised by the lens body and has a fixed orientation relative to the lens body.

Particularly, an extension of the wall portion along the optical axis is in the range of 100 μm to 1.000 μm, particularly 350 μm.

The wall portion is particularly a structural stabilizing component of the lens.

The wall portion might be made of a non-transparent material such that stray light is reduced.

Thee wall portion might have a cylindrical or toroidal shape.

Depending on the lens design, the wall portion might also have polygonal or oval cross-section extending orthogonally to the optical axis.

The first and or second opening of the wall portion might differ from the clear aperture of the lens shaping element.

Particularly, the first and the second opening of the wall portion are centered on the optical axis of the lens, particularly the openings of the wall portion enclose the optical axis of the lens.

Particularly, the first and the second opening of the wall portion are concentrically arranged with respect to each other, centered on the optical axis of the lens.

According to another embodiment of the invention, the wall portion is connected with, particularly attached to the first side to the second side of the first membrane.

Connection may be facilitated by means of glue, bonding or welding techniques.

According to another embodiment of the invention, the lens shaping element is arranged inside the lens volume and circumferentially connected with the first side of the lens shaping element to the second side of the first membrane, thereby forming the lens area of the first membrane. In particular, the lens shaping element delimits the lens volume partially. For example, the lens shaping element is in direct contact with the liquid in the lens volume.

According to another embodiment of the invention, the aperture of the lens shaping element, particularly the lens area is smaller than the second opening of the wall portion.

According to another embodiment of the invention, the aperture of the lens shaping element, particularly the lens area is larger or of the same size than the second opening of the wall portion.

According to another embodiment of the invention, the third membrane is circumferentially connected to a wall portion and/or to the lens shaping element. The features of the wall portion are particularly defined in more detail in another embodiment.

According to another embodiment of the invention, the third membrane is connected with its first side to the first side of the wall portion.

According to another embodiment of the invention, the lens shaping element is connected, particularly with a second side of the lens shaping element to the first side of the wall portion.

This embodiment particularly comprises embodiments in which the lens shaping element is arranged inside the lens volume.

According to another embodiment of the invention, the wall portion is integrally formed with the lens shaping element, particularly wherein the first opening of the wall portion is formed by the clear aperture of the lens shaping element. In the same sense, the lens shaping element may be considered to be integrally formed with the wall portion, particularly wherein the aperture of the lens shaping element is formed by the first opening of the lateral wall portion.

This embodiment allows for a less complex lens manufacturing process, as fewer parts are required for lens assembly.

According to another embodiment of the invention, the lens shaping element is arranged on and connected to the first side of the first membrane, particularly wherein the lens shaping element is connected with its second side to the first side of the first membrane.

According to another embodiment of the invention, the first side of the wall portion is connected to the second side of the first membrane in a sealing fashion.

According to another embodiment of the invention, the aperture of the lens shaping element, particularly the lens area is smaller than the first opening of the wall portion. This embodiment allows for the lens to have a larger aperture on the side of the window element than on the side of the lens shaping element. Stray light may be reduced according to this embodiment.

According to another embodiment of the invention, the lens shaping element consists of a wall structure enclosing the aperture circumferentially, particularly wherein the wall structure has a toroidal shape, particularly wherein the wall structure forms a rectangular, square, oval, ellipsoid or circular aperture of the lens shaping element. According to this embodiment, the lens shaping element may be formed as a ring or a morphologically identical to a ring.

Particularly, the lens shaping element has an outer diameter and an inner diameter, wherein the inner diameter corresponds to the clear aperture of the lens shaping element.

The lens shaping element in this form is easy to manufacture, widely available and intrinsically stable.

According to another embodiment of the invention, the lens shaping element is a ring-shaped element, particularly wherein the ring-shaped element has a rectangular, square, oval, elliptical or circular aperture of the lens shaping element.

According to another embodiment of the invention, the lens shaping element is overlappingly arranged with the lateral wall portion, such that a rigid connection is formed between the wall portion and the lens shaping element or wherein the lens shaping element is arranged non-overlappingly with the lateral wall portion, particularly wherein the lens shaping element is connected to a part of the lens or an external member that may be arranged fixedly with respect to the window element.

According to another embodiment of the invention, the wall portion comprises a circumferential recess around the first opening, wherein the lens shaping element is arranged in the circumferential recess and connected to the wall portion, particularly wherein the lens shaping element is formed corresponding to a recess shape, such that a well-defined position with respect to the wall portion is adopted in the assembled state. This embodiment allows for a precise assembly of the lens during manufacturing.

According to another embodiment of the invention, the window element, particularly an area covered by the window element, more particularly the window portion of the second membrane, is larger than the aperture of the lens shaping element, particularly wherein the window element is larger than the aperture of the lens shaping element even if the window element is tilted with respect to the aperture of the lens shaping element.

This embodiment essentially renders the window element invisible at any orientation with respect to the clear aperture of the lens shaping element, as no edges of the window element can interfere with the incident light propagating through the lens.

According to another embodiment of the invention, the second opening of the wall portion is larger, smaller or equal in size than the first opening of the wall portion.

According to another embodiment of the invention, the first and the second opening of the wall portion extend parallel to each other, particularly in an x-y plane, particularly orthogonally to a z-axis of the lens.

According to another embodiment of the invention, the wall portion comprises a step-like contour, e.g. a discontinuity in the contour, between the first and the second opening at which the diameter of the wall portion changes, particularly wherein the step is formed by a protrusion of the wall portion that extends along a plane parallel to the first and the second opening of the wall portion, particularly wherein the protrusion is formed by the lens shaping element.

This embodiment allows for a larger degree of stray light reduction.

According to another embodiment of the invention, the first membrane has a first stiffness $k_1$ and/or a first thickness and the second membrane has a second stiffness $k_2$ and/or a second thickness, wherein the second stiffness $k_2$ and/or the second thickness is smaller than the first stiffness $k_1$ and/or the first thickness.

This embodiment allows for comparably low actuation forces, as the bending of the free portion of the second membrane may be facilitated with little force, while the first membrane is rendered comparably robust due to its increased stiffness/thickness as compared to the second membrane.

According to another embodiment of the invention, the first membrane has a first thickness $t_1$ and the second membrane has a second thickness $t_2$, wherein the second thickness $t_2$ is smaller than the first thickness $t_1$.

This embodiment allows for comparably low actuation forces, as the bending of the free portion of the second membrane may be facilitated with little force, while the first membrane is rendered comparably robust due to its increased stiffness/thickness as compared to the second membrane.

According to another embodiment of the invention, the lens shaping element forms the lateral wall portion for the lens volume, the first volume and/or the second volume.

According to another embodiment of the invention, the lens comprises the components of the actuation element that is rigidly connected, particularly attached to the window element, wherein said actuation element extends laterally from the window element with a lateral mover element beyond the wall portion and comprises a coil portion that is that is arranged laterally beyond the wall portion on the lateral mover element, wherein said coil portion comprises one or more coils, wherein said one or more coils are arranged such on the coil portion that the one or more coils extend with a coil axis of the at least one coil along the wall portion, particularly towards a lateral plane of the lens shaping element, particularly essentially parallel to the z-axis of the lens, for each coil a corresponding magnetic portion, wherein said magnetic portion is arranged at the wall portion of the lens, such that a Lorentz force can be induced in the at least one coil that provides a tilting force to the actuation element and thereby to the window portion, such that a refractive power of the lens can be adjusted.

This embodiment of the lens allows for Lorentz force-induced actuation of the lens.

The coils particularly extend circumferentially around the lens volume with their respective coil axes essentially parallel to the optical axis of the lens.

Upon actuation of the lens, it might be that at least some coils will adopt a slightly tilted state with respect the optical axis. This tilt movement and also the lateral movement of the coils along the optical axis might be limited by a hard stop.

Particularly, the magnetic portion comprises at least one magnet, particularly one permanent magnet or a plurality of magnets that are correspondingly arranged to the coils at the wall portion.

This embodiment allows for robust actuation of the lens even in the presence of other, external magnetic fields.

According to another embodiment of the invention, the lens comprises a hard stop portion rigidly connected to the lens with respect to the shaping element, wherein the hard stop portion extends laterally over the coil portion at a distance, such that a movement along at least one direction of the z-axis of the coil portion particularly the mover element is mechanically limited by said distance between the coil portion and the hard stop element.

This embodiment provides a mechanical shock protection as well as an overdrive-protection for the lens, in case a control signal for the coils would cause the lens to be adjusted beyond an adjustment range.

According to another embodiment of the invention, the lens comprises a mechanical stop device that is arranged such at the lens that movement of the window element with regard to a fixedly arranged lens body, particularly the fixedly arranged lens shaping element along the optical axis and/or a movement orthogonally to the optical axis is limited by the mechanical stop device, particularly along a back and forth direction, or wherein the stop device is arranged such at the lens that a movement of the lens body, particularly the lens shaping element with respect to the fixedly arranged window element along the optical axis and/or a movement orthogonally to the optical axis is limited by the mechanical stop device, particularly along a back and forth direction.

For example, the stop device limits the relative motion of the window element and the lens shaping element along the optical axis. In particular, the stop device does not limit a tilt of the window element with respect to the lens shaping element. This embodiment allows for mechanical shock protection and overdrive states of the lens, particularly when the lens is built-in optical systems.

According to another aspect of the invention, the problem is solved by a lens barrel comprising an optical assembly, with at least one solid lens having a fixed focal length, and wherein the lens barrel further comprises the lens according to any of the preceding embodiments.

The lens barrel particularly comprises a rigid barrel wall that circumferentially encloses the optical assembly as well as the lens according to the invention, wherein the optical assembly and the lens are fixedly arranged in the lens barrel, such that the lens barrel may be used in an optical system as a pre-manufactured electro-optical component.

According to another embodiment of the lens barrel, the liquid lens is arranged at a first and/or a second opening of the lens barrel as the first optical component (apart from protective optical elements such as transparent windows), particularly wherein the optical assembly is arranged completely optically behind or in front of the liquid lens in the lens barrel.

The term optical component therefore particularly relates to an optical element that is configured to change the wavefront of incident light.

According to one embodiment, the lens may be altered from a negative to a positive lens by actuation or the lens may be changed from a positive lens to a negative lens by actuation.

For example, in a non-actuated state of the lens, the first membrane is concavely curved, and upon actuation the first membrane becomes convexly curved. Alternatively, the in a non-actuated state of the lens, the first membrane is convexly curved, and upon actuation the first membrane becomes concavely curved. Advantageously, switching between a negative and a positive lens enables a particularly large tuning range and a versatile application of the tunable lens.

According to a second aspect to the invention, the problem is solved by an optical system, comprising the lens according to any of the previous embodiments, wherein the system comprises at least one lens, i.e. a conventional rigid glass or polymer lens having a fixed focal length and an optical sensor, particularly an image sensor, arranged along an optical axis of the system, wherein the liquid lens and the at least one solid lens are fixedly arranged in a lens barrel, particularly the lens barrel, along the optical axis of the system, particularly wherein the first membrane of the liquid lens is closer to the sensor than the second membrane of the liquid lens.

According to another aspect of the invention, the problem is also solved by a reluctance motor assembly for adjusting the optical power of the liquid lens according to the invention.

According to another embodiment of the invention, the reluctance motor assembly is comprised by the optical system.

According to another embodiment of the invention, the optical system is a wide-angle, a macro-, a tele-, or a zoom-system.

According to another embodiment of the invention, the optical system comprises a first optical assembly with at least one lens having a fixed focal lens, and a second optical assembly comprising at least one lens having a fixed focal length, wherein the first and the second optical assembly are connected to a rigid lens barrel, particularly the lens barrel, wherein the liquid lens is arranged between the first and the second optical assembly with respect to the optical path of the optical system.

According to another embodiment of the invention, the system comprises a first control circuit that is configured to provide an electronic signal to an actuation assembly of the liquid lens configured to tilt the window element of the lens in response to a movement of the optical system such that an image on the sensor is stabilized, particularly wherein the first control circuit is configured to control a position of the at least one lens having fixed focal length.

This embodiment allows for image stabilization for example in hand-held devices such as mobile phone comprising an image sensor, such as a camera.

According to another embodiment of the invention, the liquid lens is arranged in the system for focusing an image to the sensor.

According to another embodiment of the invention, the liquid lens is arranged in the system for stabilizing an image position on the sensor.

Image stabilization can be achieved by tilting the window element in response to a recorded motion of the system accordingly.

As actuation of the lens is comparably fast, image stabilization is achieved fast as well such that sharper images may be acquired with the optical system.

According to another aspect of the invention, the problem is solved by a method, particularly a computer-implemented method for controlling the optical properties such as the optical power as well as prism of a liquid lens or an optical system according to the invention, wherein the method comprises the steps of:

in response to a first control signal provided by a computer or a processor unit causing an actuation assembly particularly comprising the actuation element connected to the window element to tilt the window element relative to the aperture of the lens shaping element such that a light beam is deflected with respect to an optical axis of the liquid lens, and/or in response to a second control signal provided by the computer or the processor unit causing the actuation assembly to move the window element translationally, particularly along the optical axis, with respect to the aperture of the lens shaping element such that an optical power of the liquid lens is adjusted.

According to another aspect of the invention, the problem is solved by a method, particularly a computer-implemented method for controlling the optical properties such as the optical power as well as prism of a liquid lens or an optical system according to the invention, wherein the method comprises the steps of:

in response to a first or third control signal provided by a computer or a processor unit causing an actuation assembly connected to the lens body and/or the lens shaping element to tilt the lens body and/or the lens shaping element relative to window element, and/or in response to a second or fourth control signal provided by the computer or the processor unit causing the lens assembly to move the lens body and/or the lens shaping element translationally, particularly along the optical axis, with respect to the window element such that an optical power of the liquid lens is adjusted.

The Figures are appended to the claims and are accompanied by text explaining individual features of the shown embodiments and aspects of the present invention. Each individual feature shown in the Figures and/or mentioned in said text of the Figures may be incorporated (also in an isolated fashion) into a claim relating to the device according to the present invention.

BRIEF DESCRIPTION OF FIGURES

FIG. 4 shows a schematic cross-section through a lens according a fourth embodiment of the invention detailing the wall portion;

FIG. 5 shows a schematic cross-section through a lens according a fifth embodiment of the invention detailing a position of the lens shaping element;

FIG. 6 shows a schematic cross-section through a lens according a sixth embodiment of the invention detailing a position of the lens shaping element;

FIG. 7 shows a schematic cross-section through a lens according a seventh embodiment of the invention detailing a position of the lens shaping element as being matched to a recess in the wall portion;

FIG. 9 shows a schematic cross-section through a lens according a ninth embodiment of the invention;

FIG. 10 shows a schematic cross-section through a lens according a tenth embodiment of the invention; the lens having two membranes forming a cushion-like lens volume;

FIG. 11 shows a schematic cross-section through a lens according an eleventh embodiment of the invention; the lens being corrected for coma aberrations;

FIG. 12 shows a schematic cross-section through a lens according a twelfths embodiment of the invention; the lens being corrected for coma aberrations;

FIG. 14 shows a schematic cross-section through a lens according a fifteenth embodiment of the invention: the lens being corrected for coma aberrations;

FIG. 30 shows a schematic cross-section through a lens being a part of an optical system with additional hard lenses according a thirtieth embodiment of the invention;

FIG. 31 shows several perspective views of a lens according to an embodiment of the invention.

DETAILED DESCRIPTION

Figure 1C:
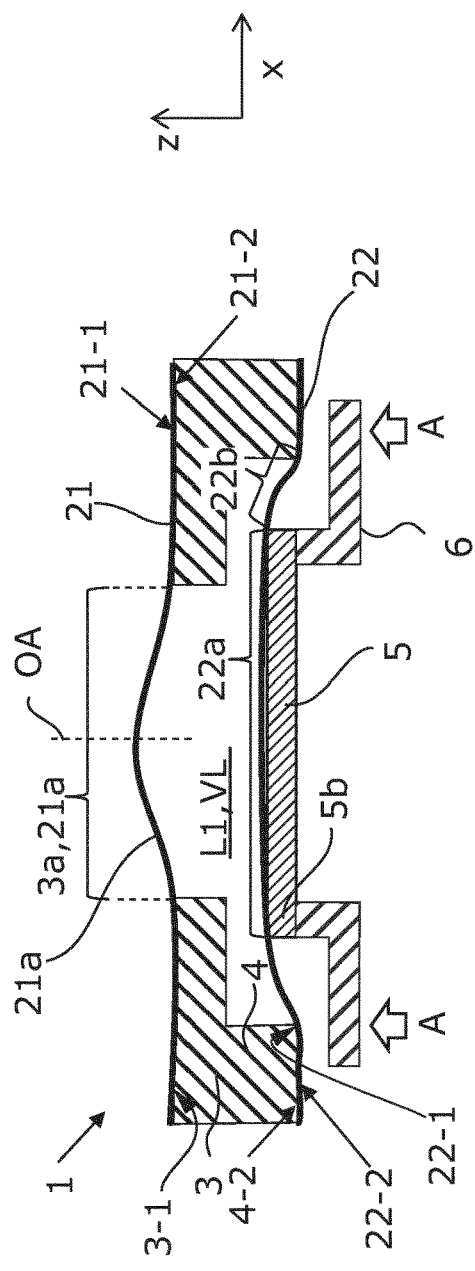
FIG. 1 shows a schematic cross-section through a lens according a first embodiment of the invention, in an equilibrium state and in three different actuated states.

In FIG. 1A a schematic cross-section through a lens 1 according to the invention is shown. The lens 1 has on optical axis OA that extends along a z-axis of a Cartesian coordinate system (indicated as arrows with x, y and z). Laterally, the lens 1 extends along the x and y-axis of said coordinate system. While the x axis can point along the picture plane, the y axis might point outward the picture plane or vice versa.

The lens 1 comprises a lens volume VL that is enclosed by the first membrane 21, the second membrane 22 and a rigid lateral wall portion 4 as well as the lens shaping element 3.

The lateral wall portion 4 and the lens shaping element 3 are formed integrally with each other in the embodiment of FIG. 1A.

Nonetheless, for reasons of consistency with other embodiments of the lens 1, the lens shaping element 3 and the wall portion 4 are treated as different members of the lens 1. The wall portion 4 has a first side 4-1 (cf. FIG. 4) facing toward the first membrane 21 and a second side 4-2 facing in the opposite direction. The wall portion 4 comprises a first opening 4a on the first side 4-1 and a second opening 4-2 on the second side 4-2. The lens shaping element 3 has a clear aperture 3a comprising the optical axis OA of the lens 1, such that a clear lens area 21a for the first membrane 21 is formed, wherein in the lens area 21a of the first membrane 21 is deformable and light can propagate through the lens 1 via the lens area 21a.

The lens shaping element 3 is formed as a ring-shaped member with a clear aperture 3a that encircles the lens area, wherein the wall portion 4 is formed as a ring-shaped member as well.

The wall portion 4 and the lens shaping element 3 extend circumferentially around the optical axis OA of the lens 1.

The first membrane 21 is a transparent distensible, i.e. an elastically deformable membrane, and has a first side 21-1 that faces away from the lens volume VL and a second side 21-2 that faces towards the lens volume VL.

The first membrane 21 is sealingly and circumferentially attached with its second side 21-2 to a first side 3-1 of the lens shaping element 3.

The opening 4a, 4b of the wall portion 4 is larger than the aperture 3a of the lens shaping element 3. The second membrane 22 is sealingly and circumferentially connected with a first side 22-1 of the membrane 22 to the second side 4-2 of the wall portion 4 and covers the second opening 4b of the wall portion 4.

The second membrane 22 is a transparent and distensible membrane.

The first side 22-1 of the second membrane 22 faces toward the lens volume VL and a second side 22-2 of the second membrane 22 faces away from the lens volume VL.

The first side 22-1 of the second membrane 22 and the second side 21-1 of the first membrane 21 are in direct contact with a first liquid L1 of the lens 1 that is enclosed in the lens volume VL by the first and second membrane 21, 22 and the wall portion 4 as well as the lens shaping element 3.

A rigid, transparent window element 5 is connected to the second membrane 22 at the second side 22-2 of the second membrane 22.

The window element 5 extends symmetrically around the optical axis OA over a window portion 22a of the second membrane 22. The window portion 2a of the second membrane 22 is circumferentially enclosed by a free portion 22b of the second membrane 22 that is not covered by the window element 5, such that the window element can be moved along the z-axis and to some extend also laterally along the x- and/or y-axis. Any motion of the window element 5 will cause the free portion 22*a* of the second membrane 22 to bend in order to allow the motion of the window element 5.

Thus, the window element 5 is not directly connected (but only via the free portion 22*a* of the second membrane 22) to the wall portion 4 or the lens shaping element 3 and can therefore move relatively to the wall portion 4 as well as to the lens shaping element 3.

An actuation element 6 is rigidly connected to the window element 5 at a connecting portion 5*b* and forms a clear aperture 5*a* of the window element 5. The clear aperture 5*a* comprises the optical axis OA of the window element 5.

The actuation element 6 extends laterally away from the window element 5 and allows an actuation force to be provided to the window element 5.

FIG. 1A shows the lens 1 when no actuation force is applied to the actuation element 6.

FIG. 1B shows the same lens as depicted in FIG. 1A, but with an actuation force (indicated by the arrows A next to the actuation element 6) applied to the actuation element 6. On one side the actuation force pushes the window element 5 towards the clear aperture 3*a* of the lens shaping element 3 and on the other side of the window element 5 (facing outward the lens volume VL), the window element 5 is pulled away from the aperture 3*a* of the lens shaping element 3.

As can be seen, the free membrane portion 22*b* of the second membrane 22 bends and stretches accordingly.

In the situation shown in FIG. 1B a net movement of the window element 5 toward the clear aperture 3*a* of the lens shaping element 3 is achieved, which eventually produces a bending force also on the first membrane 21 such that the first membrane 21 is pushed away at the lens area 21*a* from the aperture 3*a* of the lens shaping element 3 forming a symmetric convex membrane surface Therefore, by moving the window element 5, the refractive power of the lens 1 can be adjusted.

Despite the asymmetric tilted state of the window element 5 with respect to the wall portion 4 and the lens shaping element 3, the bending of the lens area 21*a* of the first membrane 21 occurs symmetrically around the optical axis OA of the lens 1. Particularly, the clear aperture 3*a* of the lens shaping element 3 defines the optical axis OA of the lens 1 independently of the actuation state of the window element 5. This allows for greater manufacturing and assembly tolerances for the lens 1. Also, with respect to the actuation of the window element 5, greater tolerance is achieved by having the first and/or the second opening 4*a*, 4*b* of the wall portion 4 larger than the clear aperture 3*a* of the lens shaping element 3. Particularly, the window element 5 has a larger aperture 5*a* than the clear aperture 3*a* of the lens shaping element 3, which allows for even greater manufacturing tolerance without affecting the optical quality of the lens 1.

The advantage of window element 5 moving with respect to the lens shaping element 3 is that the deformation of the lens area 21*a* is always symmetric with respect to the optical axis OA, independent of any asymmetric motion are lateral shift (e.g. along the x or y axis) of the window element 5 with respect to the lens shaping element 3. This allows for a better optical performance of the lens 1 according to the invention, particularly any lateral offset of wave front propagating through the lens 1 due to a non-centered and/or non-symmetric surface shape of the lens area 21*a* is prevented.

In configurations known in the art, where the lens shaping element is moved relative the wall portion (or the window element), any lateral shift or asymmetric motion of the lens shaping element causes a correspondingly asymmetric deformation of the first membrane.

To illustrate this, in FIG. 10 the same lens 1 is shown, but this time an actuation force is applied that pushes the window element 5 toward the aperture 3*a* of the lens shaping element 3 on both sides to the same extent.

Due to the incompressible first liquid L1 in the lens volume VL, the actuation force causes the lens area 21*a* to bend outward of the aperture 3*a* of the lens shaping element 3. The shape of the lens area 21*a* is symmetric to the optical axis OA as well.

Thus, by tilting the window element 5 accordingly, a wave front of light propagating through the lens 1 can be adjusted such as to compensate for slight offsets with regard to the optical axis of the lens 1 in a lens assembly or an optical system. In other words, an additional prism function can be integrated in the lens 1 by asymmetric actuation of the window element 5.

Figure 1D:
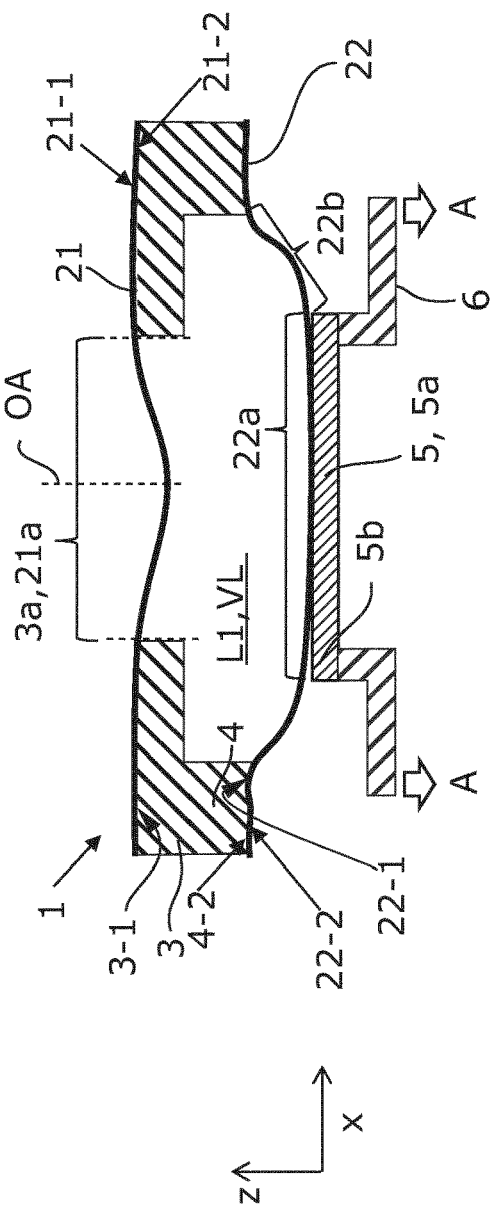

With the lens 1 it is also possible to achieve negative refractive power, by pulling the window element 5 away from the aperture 3*a* of the lens shaping element 3, which causes the lens area 21*a* to deform in a symmetric concave fashion. This is shown in FIG. 1D.

The second membrane 22 might be softer, i.e. less stiff, than the first membrane 21, which allows for lower actuation forces of the lens 1.

Moreover, a geometric extension along the z-axis of the lens 1 is reduced by having the lens shaping element 3 fixed relative to the movable window element 5.

Figure 2:
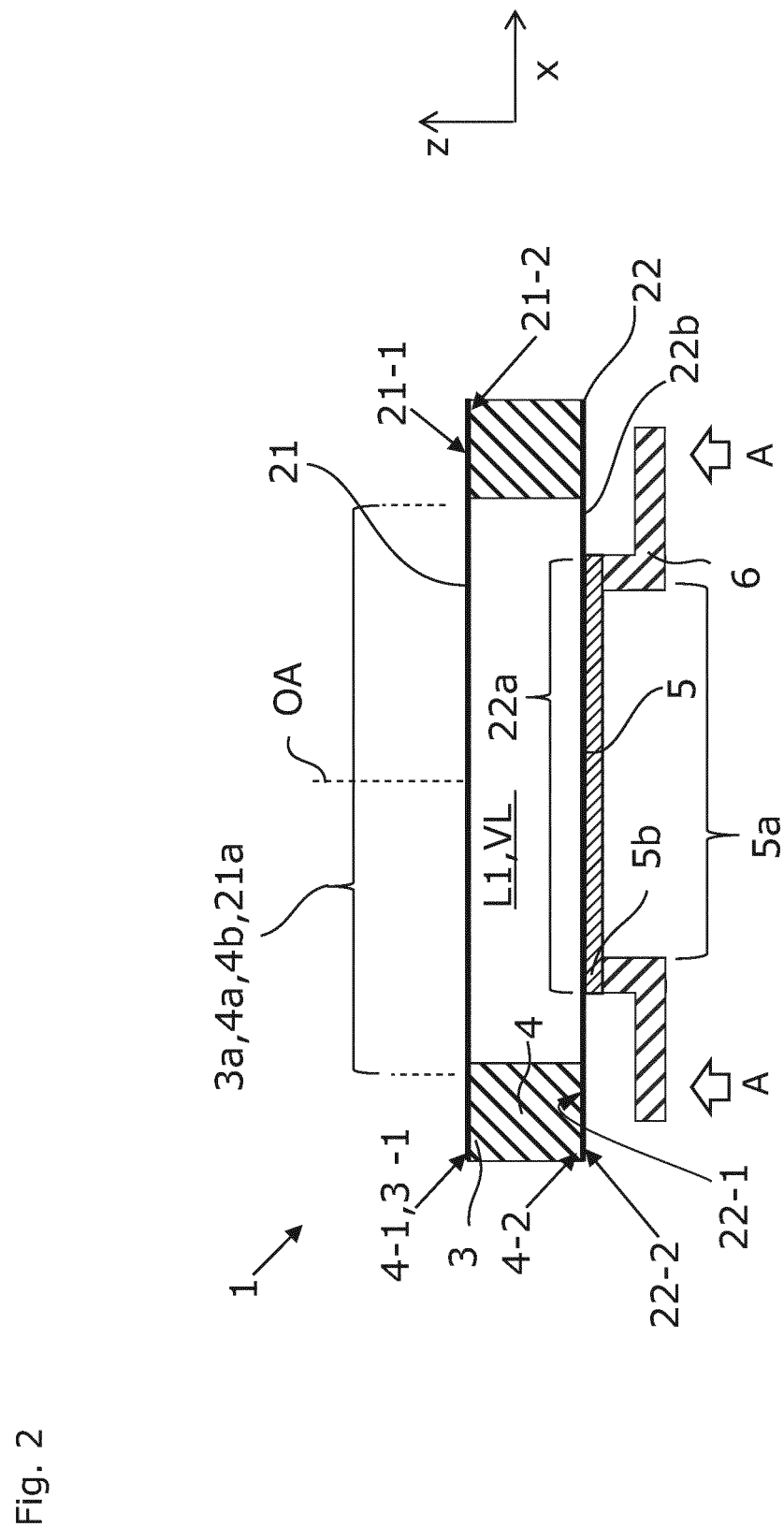
FIG. 2 shows a schematic cross-section through a lens according a second embodiment of the invention.

In FIG. 2 a similar lens 1 as in FIG. 1A is shown in equilibrium state by means of a schematic cross-sectional view of the lens 1. In contrast to FIG. 1, in FIG. 2 the aperture 3*a* of the lens shaping element 3 and the openings 4*a* and 4*b* of the wall portion 4 have the same size. Thus, the lens shaping element 3 and the wall portion are essentially formed as a cylinder.

It is noted that the aperture 5*a* on the window element 5 of actuation element 6 is smaller than the lens area 21*a*.

This allows for an additional aperture function of the lens 1 provided by the aperture 5*a* that reduces stray light and ghosting effects of the lens 1.

Figure 3:
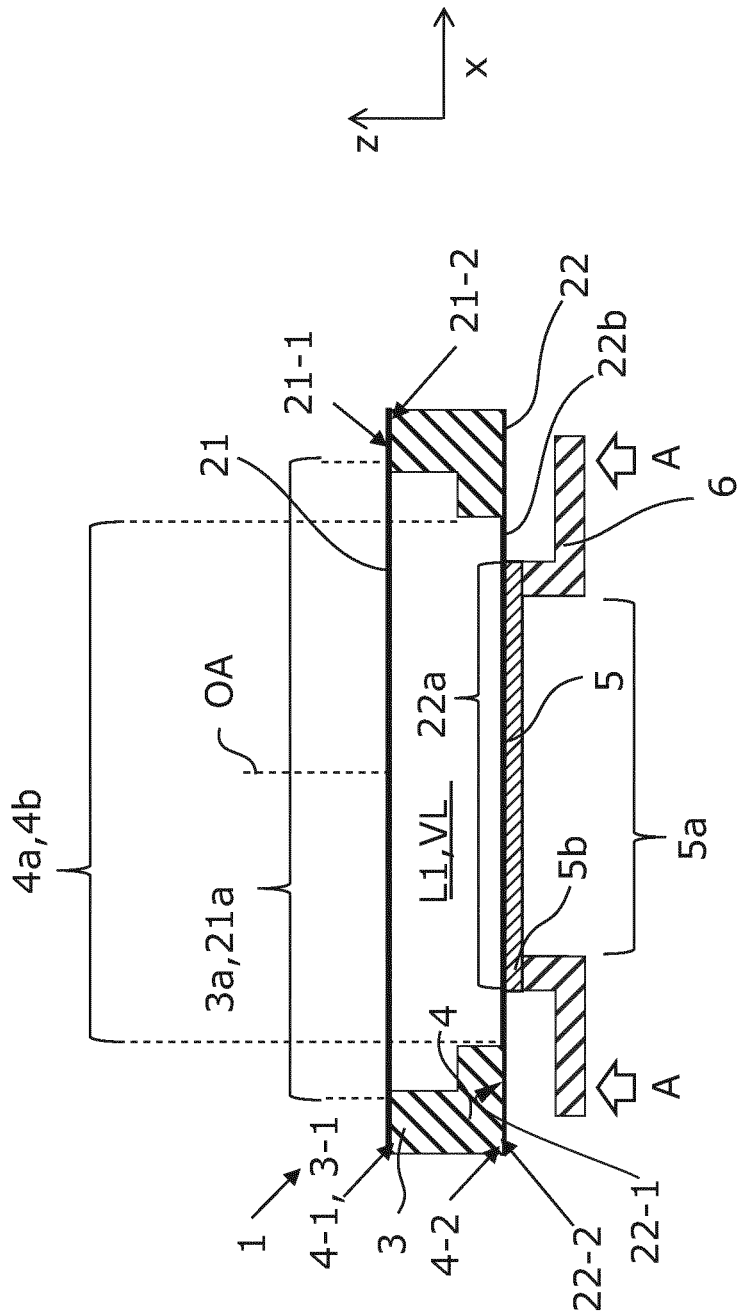
FIG. 3 shows a schematic cross-section through a lens according a third embodiment of the invention.

In FIG. 3 an embodiment of the lens is shown, where the openings 4*a*, 4*b* of the wall portion 4 are smaller than the clear aperture 3*a* of the lens shaping element 3 and thus the lens area 21*a*. This provides some additional aperture to the lens 1 that is particularly useful when the lens 1 is used for large incidence angles of light entering the lens 1 from the side of the window element 5. This design suppresses stray light caused by large incident angles of light due to the smaller opening 4*a*, 4*b* of the wall portion 4.

FIG. 4 shows an embodiment similar to the embodiment of FIG. 1, with the difference that the wall portion 4 and the lens shaping element 3 are formed as separate members that are connected to each other, e.g. by means of glue.

This allows for manufacturing the wall portion 4 and the lens shaping element 3 from different materials, particularly wherein the lens shaping element 3 might comprise a metal compound or a magnetic compound that might be essential used for an actuation capability of the actuation element 6.

FIG. 5 shows an embodiment in which the lens shaping element 3 is arranged outside the lens volume VL. The wall portion 4 now forms the lateral container walls that enclose the lens volume VL in which the first liquid L1 is comprised.

The first side 4-1 of the wall portion 4 is circumferentially and sealingly connected with the second side 21-2 of the first membrane 21 and the second side 4-2 of the wall portion 4 is circumferentially connected with the second side 22-2 of the second membrane 22.

The first opening 4a of the wall portion 4 is smaller than the second opening 4b of the wall portion 4. The wall portion 4 is essentially formed from two ring shaped portions having different diameter.

The lens shaping element 3 is connected with a second side 3-2 to the first side 21-1 of the first membrane 21. The aperture 3a of the lens shaping element 3 is slightly smaller than the first opening 4a of the wall portion 4.

The lens shaping element 3 is connected rigidly via the first membrane 21 to the wall portion 4 by having an overlapping portion with the wall portion 4.

It is noted that the window element 5 and the corresponding aperture 5a is larger than the aperture 3a of the lens shaping element 3, such that in a tilted actuation configuration of the window element 5, the clear aperture 3a of the lens shaping element 3 is not obstructed or affected by the actuation element 6.

In FIG. 6 a similar embodiment of the lens 1 of FIG. 5 is shown, wherein the lens shaping element 3 is arranged non-overlappingly with the wall portion 4. The lens shaping element 3 can be fixed relative to the wall portion by a housing member (not shown) of the lens 1 or another external component (not shown). This embodiment allows for defining the clear aperture of the lens 1 by an external component (i.e. the lens shaping element 3) during assembly of the lens, which increases manufacturing tolerances during assembly and which provides increased flexibility for using differently shaped lens shaping elements 3 without the necessity of a redesign of the lens 1, i.e. the body of the lens 1 remains the same, while the size and shape of the lens area 21a can be defined by choosing the appropriate lens shaping element 3 with an appropriate shaped clear aperture 3a (e.g. circular, rectangular or oval).

In FIG. 7 another embodiment regarding the lens shaping element 3 and the wall portion 4 is shown.

The wall portion 4 comprises a recess in which the lens shaping element 3 is comprised inside the lens volume VL. This allows for a larger contact area of the lens shaping element 3 to the wall portion 4, which in turn allows for a more stable connection between the lens shaping element 3 and the wall portion 4. Moreover, the lens shaping element 3 might be made from a different material than the wall portion 4.

Figure 8:
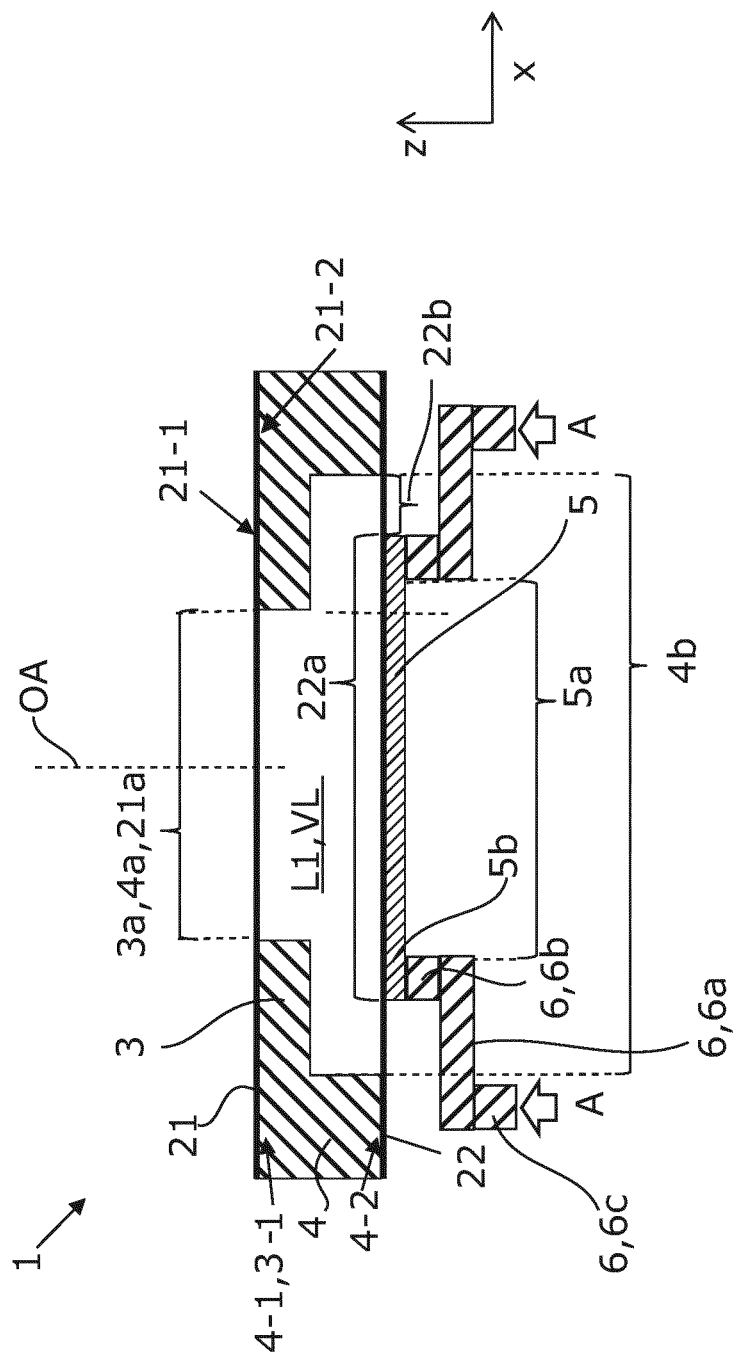
FIG. 8 shows a schematic cross-section through a lens according an eights embodiment of the invention.

FIG. 8 shows a similar embodiment as shown in FIG. 1.

In addition to the embodiment of FIG. 1, the actuation element 6 comprises a rigid portion 6a that extends laterally along a plane of the window element 5 without obstructing the window aperture 5a. The rigid portion 6a might be ring-shaped or arm-shaped. The rigid portion 6a is connected to the window element 5 via a damping element 6b and at its outer portion the rigid portion 6a has another damping element 6c arranged. The damping elements 6b, 6c are softer than the rigid portion 6a of the actuation element 6 and the window element 5 and are configured to absorb vibrations and to provide a larger stroke of the actuation element 6 that is only partially translated to the lens area 21a. A larger stroke of the actuation element 6 in turn increases an actuation sensitivity of the lens 1, as the stroke is partially absorbed (e.g. by a deformation/compression/extension) by the damping elements 6b, 6c, when the window element 5 is moved from its equilibrium position. This in turn allows to use actuators having a lower stroke resolution and that are more cost efficient.

As similar effect can be achieved with a lens 1 as shown in FIGS. 9A and 9B.

Here, the actuation element 6 comprises a spring element 6s extending laterally from the window element 5. Here, the spring element 6s allows for the larger stroke of the actuation element 6. The stroke (i.e. movement of the actuation element 6) is not fully translated to the lens area 21a but is partially absorbed by a deformation of the spring element 6s as can be seen in FIG. 9B.

FIG. 10 shows an embodiment of the lens 1 devoid of the rigid wall portion 4.

The lens volume VL with the first liquid L1 is completely enclosed by the first membrane 21 and the second membrane 22 only.

In a first variant, the first 21 and the second membrane 22 are two separate membranes that are sealingly and circumferentially connected, e.g. glued or plasma-bonded, at a lateral membrane portion 21-22 of the lens volume VL, wherein the lateral portion 21-22 extends circumferentially around the lens area 21a of the first membrane 21 and circumferentially around the free portion 22b of the second membrane 22.

This allows using different membranes for the first 21 and the second membrane 22.

In another variant, the first 21 and the second membrane 22 are integrally formed, e.g. by a sleeve-like membrane and sealed at the openings of said sleeve.

The lens shaping element 3 is arranged outside the lens volume VL (but could also be arranged inside the lens volume VL) as shown in previous embodiments.

Upon actuation of the window element 5 relative to the lens shaping element 3 the lens area 21a bends outwards or inwards. At the same time, it might be that the lateral portion 21-22 and/or the free portion 22b also bend. This provides a damping effect, which in turn allows for larger stroke actuation resulting in a higher actuation resolution of the lens 1.

The lens 1 according to this embodiment can be manufactured comparably cost-efficient as no wall portion is needed.

In the following, several advanced embodiments of the lens 1 according to the invention are described that can be combined with the embodiment of the FIGS. 1 to 10. The lens 1 according to some embodiments can be configured to compensate for acceleration-induced aberrations, such as gravity-induced coma.

For this purpose, the lens 1 comprises a first volume V1 comprising the first liquid L1 and a separate second volume V2 with a second liquid L2. Thus, the lens volume VL is split into the first V1 and the second volume V2.

The physical properties of the first and the second liquid L1, L2 might be chosen such that the acceleration-induced aberrations are compensated. Such physical properties comprise the refractive index $n_1$, $n_2$ as well as the mass density $\rho_1$ $\rho_2$ of the first and the second liquid L1, L2. Simultaneously, it is possible to adjust some properties of the first and the second membrane 21, 22 as well as a third membrane portion 20, 23, such properties being for example the stiffness of the membranes or to adjust the thickness of the membranes that in turn might influence the stiffness of the membranes.

An example of one of such lens 1 that is configured to compensate acceleration in-induced aberrations is shown in FIG. 11. As many features of the lens of FIG. 11 are identical to the features of FIG. 1 only the differing features are elaborated in detail in order to avoid redundancy. It is obvious that also embodiments shown in FIGS. 2 to 10 can be modified accordingly in order to provide the acceleration-induced aberration compensation.

The lens 1 of FIG. 11 differs from the lens of FIG. 1 in that the lens 1 additionally comprises a separating membrane portion 20, 23 that essentially divides the lens volume VL in the first volume V1 comprising the first liquid L1 and the second volume V2 comprising the second liquid L2. The first and the second volume V1, V2 are arranged such that along the optical axis OA and particularly over the complete lateral extent of the window element aperture 5a a layer of the first and second liquid L1, L2 is arranged.

The separating membrane portion 20 has a first side 20-1 facing the first volume V1 and that is in contact with the first liquid L1 and a second side 20-2 that faces in the opposite direction and that is in contact with the second liquid L2.

In the embodiment of FIG. 11 the separating membrane portion 20 is a separate third membrane 23, with corresponding sides 23-1 and 23-2. The third membrane 23 is sealingly and circumferentially connected with its second side 23-2 to the first side 22-1 of the second membrane 22, such that the second volume V2 is formed by the third 23 and the second membrane 22 only. The second 22 and the third membrane 23 can be connected for example by means of plasma bonding or glue.

The second membrane 22 and in some embodiments the third membrane 23 cover the second opening 4-2 of the wall portion 4 and thus, seals the first liquid L1 together with the wall portion 4 and the first membrane 21 that covers the clear aperture 3a of the lens shaping element 3 such that the first volume V1 is formed.

The window element 5, as in FIG. 1, is connected to the second side 22-2 of the second membrane 22 on one side of the window element 5.

Other features of the lens 1 of FIG. 11 are essentially identical to the features of FIG. 1.

In response to a relative motion that changes the net volume of the lens volume VL of the window element 5 with respect to the lens shaping element 3, the lens area 21a bends and forms either a concave or convex surface lens surface. The membrane shape of the third membrane 23 and the second volume V2 is hardly affected by such a motion.

Therefore, the robust and accurate adjustment of the curvature of the lens area 21a that have been elaborated for the previous embodiments are maintained. In addition, the lens 1 of FIG. 11 is configured to compensate for the acceleration-induced aberrations that might be caused by gravity or another accelerating force.

For this compensating effect to take place in a non-trivial fashion, the force has to have a force component that is not in alignment with the optical axis OA of the lens 1.

By adjusting the refractive index $n_1$, $n_2$ of the first and the second liquid L1, L2 with respect to the first $\rho_1$ and the second mass density $\rho_2$ of the liquids L1, L2, such acceleration-induced aberrations can be compensated.

For example, the refractive index $n_1$ of the first liquid L1 might be chosen higher than the refractive index $n_2$ of the second liquid L2, while the mass density $\rho_1$ of the first liquid L1 is chosen to be smaller than the mass density $\rho_2$ of the second liquid L1.

This allows adjusting the optical path length through the lens volume VL such that the acceleration-induced aberrations can be compensated to full extend.

In addition, a relation between membrane stiffness $k_s$ of third membrane 23 or the separating membrane portion 20 and the stiffness $k_1$ of the first membrane 21 can be found according to $$\frac{k_s}{k_1} = \frac{n_1 - n_2}{n_1 - 1} \frac{\rho_2 - \rho_1}{\rho_1}$$

Other relations relating thicknesses of the membranes 20, 23, 21 to the refractive indices $n_1$, $n_2$ are given at another part of the specification and can be applied to this embodiment as well.

A variation of the embodiment of FIG. 11 is shown in FIG. 12. Here, the separating membrane portion 20 is integrally formed 22c with the second membrane 22. In order to provide the second volume V2 the second membrane 22 is sealingly connected with its second side 22-2 to the window element 5 only at a circumferential portion 5c of the window element 5, such that a volume is formed between an integral portion 22c of the second membrane 22 and the window element 5. Thus, the second side 22-2 of the second membrane 22 faces the second volume V2 over the area of integral portion 22c.

For this embodiment, no third membrane is required, which reduces manufacturing costs.

The relation for the stiffness and thickness of the membranes might be applied for the first and the second membrane 21, 22 accordingly.

The embodiments shown in FIGS. 11 and 12 allow for lower actuation forces and thus lower power consumption, as the third membrane 23 or the integral membrane portion 22c is not bent upon actuation of the window element 5, but only the lens area 21a of the first membrane 21 (and the free portion 22b of the second membrane 22).

Figure 13:
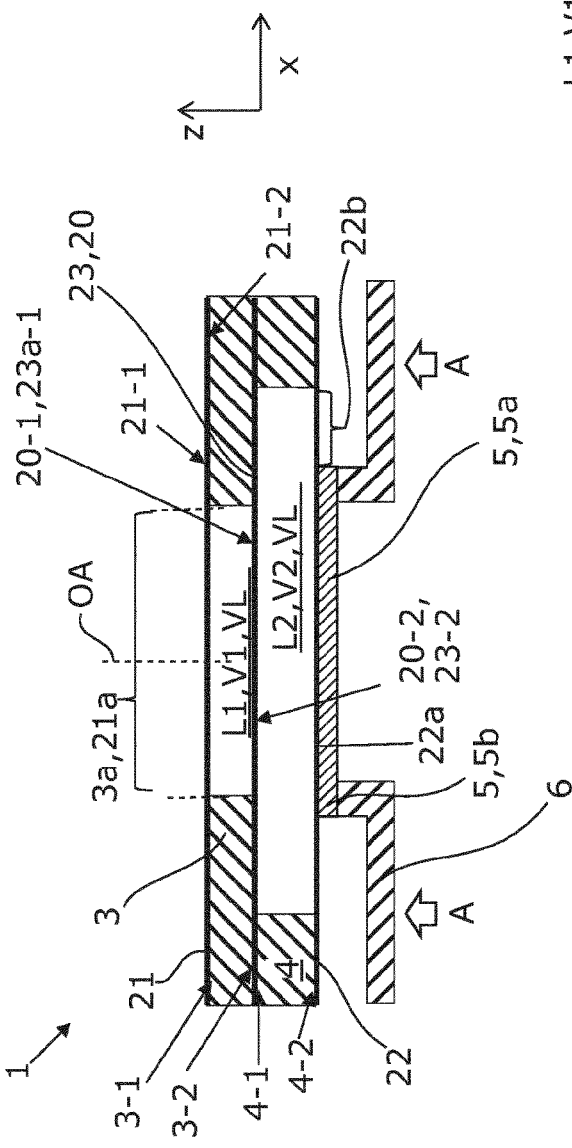
FIG. 13 shows a schematic cross-section through a lens according a thirteenth embodiment of the invention; the lens being corrected for coma aberrations.

In FIG. 13 another embodiment of the lens 1 according to the invention is shown having an acceleration-induced aberration compensation.

The lens 1 comprises a third membrane 23 as the separating membrane portion 20.

In contrast to the embodiments of FIGS. 11 and 12, in FIG. 13 the third membrane 23 is arranged along the optical axis OA between the wall portion 4 and the lens shaping element 3 and separates the lens volume into the first V1 and the second volume V2, wherein with a first side 23-1 of the third membrane 23, the third membrane 23 is in contact with the first liquid L1 and with a second side 23-2 of the third membrane 23, the third membrane 23 is in contact with the second liquid L2.

The first membrane 21 seals the lens volume VL and in particular the first volume V1 at the first side 3-1 of the lens shaping element 3, where the lens area 21a is formed by the clear aperture 3a, wherein the second membrane 22 seals the lens volume VL and in particular the second volume V2 at the second side 4-2 of the wall portion 4.

Therefore, the first liquid L1 is enclosed in the first volume V1 formed by the first membrane 21, the third membrane 23 and the lens shaping element 3, wherein the second liquid L2 is enclosed in the second volume V2 formed by the second membrane 22, the third membrane 23 and the wall portion 4.

For assembly, the third membrane 23 is connected between the lens shaping element 3 and the wall portion 4, particularly between the second side 3-2 of the lens shaping element 3 and the first side 4-1 of the wall portion 4. The lens shaping element 3 and the wall portion 4 might be formed from different materials. Particularly, the wall portion 4 might comprise a permanent electro-magnetic compound and might be shaped in a non-round fashion (when viewed along the z-axis), while the actuating element 6 might comprise a corresponding metal compound such that a reluctance driving force can be induced by these two elements causing the actuation element 6 to move relatively to the wall portion 4 and thus adjustment of the refractive power of the lens 1 can be achieved. Alternatively, the actuation element 6 is comprises a permanent electro-magnetic compound and the wall portion 4 is made of a metal compound, such as steel. For this purpose, one or more coils (not shown) might be arranged next to the wall portion 4. The lens shaping element 3 might be made of glass or a polymer.

The embodiment shown in FIG. 13 causes the third membrane 23 to bend as well, when the window element is actuated, and thus depending on the refractive indices $n_1$, $n_2$ of the first L1 and the second liquid L2, the third membrane 23 might contribute to the refractive power of the lens 1, which might be advantageous in certain instances.

Figure 14:
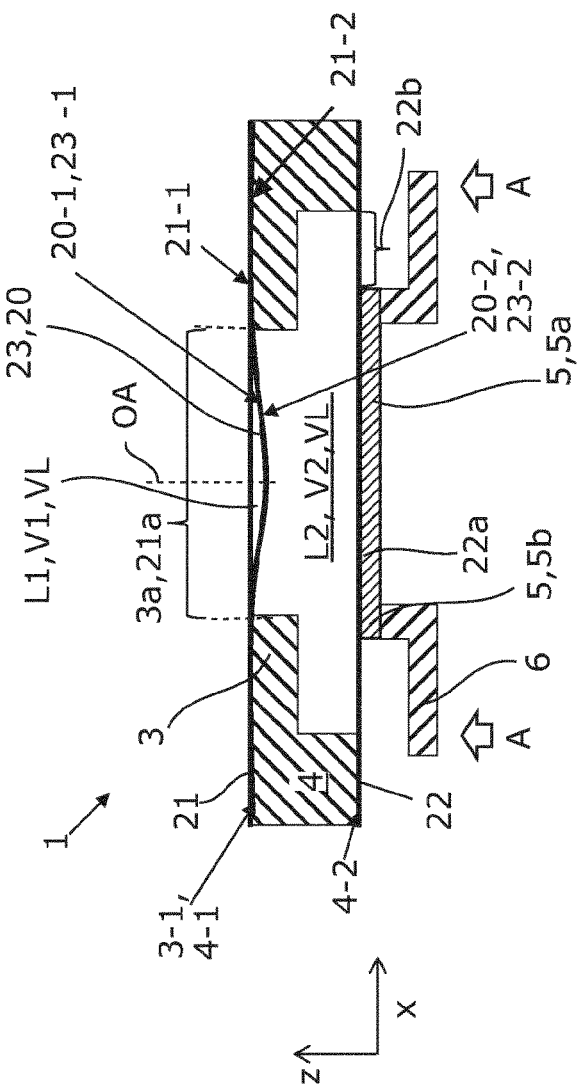
FIG. 14 shows a schematic cross-section through a lens according a fourteenth embodiment of the invention; the lens being corrected for coma aberrations.

FIG. 14 shows an embodiment of an acceleration-induced aberration compensating lens 1 according to the invention. The lens 1 has an integrally formed lens shaping element 3 and wall portion 4 like the lens shown in FIG. 1. In addition, the third membrane 23 forming the membrane portion 20 is sealingly connected with its first side 23-1, 20-1 to the second side 21-2 of the first membrane 21, such that the first volume V1 comprising the first liquid L1 is formed between the first 21 and the third membrane 23. The second volume V2 comprising the second liquid L2 is formed between the third membrane 23, the second membrane 22, the lens shaping element 3 and the wall portion 4.

The first 21 and the third membrane 23 might be connected by plasma-bonding.

Figure 15:
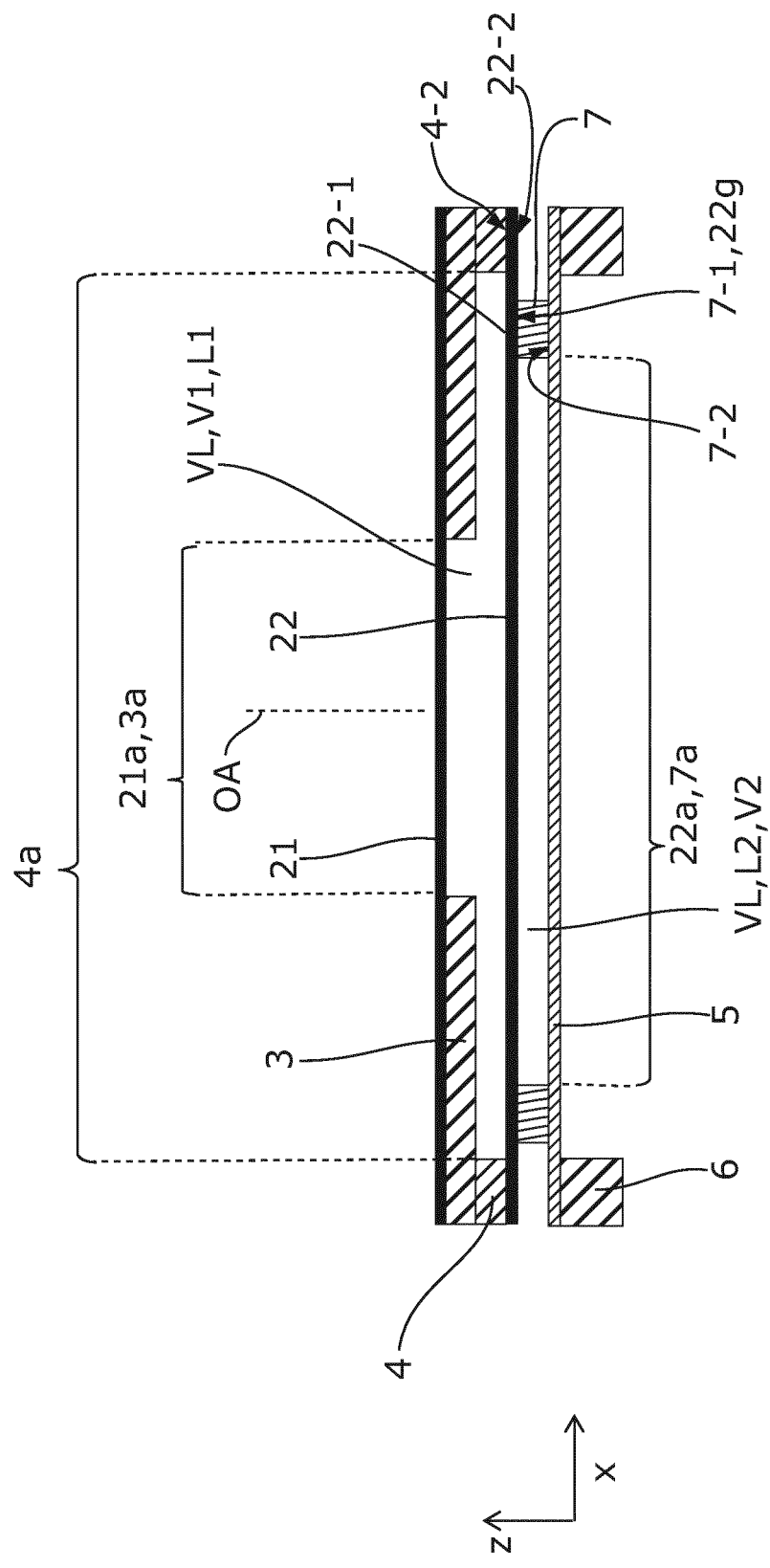

FIG. 15 shows an embodiment of the lens 1 that comprises an additional second wall portion 7 that contacts the second side 22-2 of the second membrane 22 circumferentially with a first side 7-1 of the second wall portion 7. With a second side 7-2, the second wall portion 7 is connected or integrally formed with the window element 5. The opening 7a of the second wall portion 7 defines the window portion 22a to be a flexible lens area, within which the second membrane 22 might change its surface for adjusting the refractive power of the lens 1. The first volume V1 is enclosed between the first membrane 21, the lens shaping element 3, the wall portion 4 and the second membrane 22. The second volume V2 is enclosed by the second membrane 22, the second wall portion 7 and the window element 5.

The wall portion 4 is connected with its second side 4-2 to the first side 22-1 of the second membrane 22 and faces with its first 4-1 the second side 3-2 of the lens shaping element 3.

As can be seen in FIG. 15, the openings 4a, 7a of the wall portions 4, 7 and the aperture of the lens shaping element 3 are all different, which allows a greater flexibility in terms of aperture design in combination with a reluctance motor.

While the lens shaping element 3 might be made of glass or a polymer, the wall portion 4 might be made of a metal compound such as steel and the actuation element 6 is made from a permanent electro-magnetic compound such that by means of a coil assembly (not shown) arranged at the wall portion 4, the actuation element 6 can be moved relative to the lens shaping element, causing a change of refractive power of the lens 1. The second wall portion 7 is made from a neutral material with respect to the electro-magnetic actuation. The second wall portion 7 can be regarded as a part of the window element 5. In fact, the second wall portion 7 might be made from the same material as the window element 5 or even be integrally formed with the window element 5.

Upon actuation with the actuation element 6, the window element 5 and the second wall portion 7 exert a force on a contact portion 22g of the second membrane 22 that corresponds to the first side 7-1 of the second wall portion 7.

This causes the first membrane 21 to alter its shape, i.e. its curvature, in the lens area 21a and the second membrane 22 to alter its shape in the window portion 22a accordingly, depending on the stiffness of the two membranes 21, 22. This allows for providing a double convex or double concave lens 1 with acceleration-induced aberration compensation.

Figure 16:
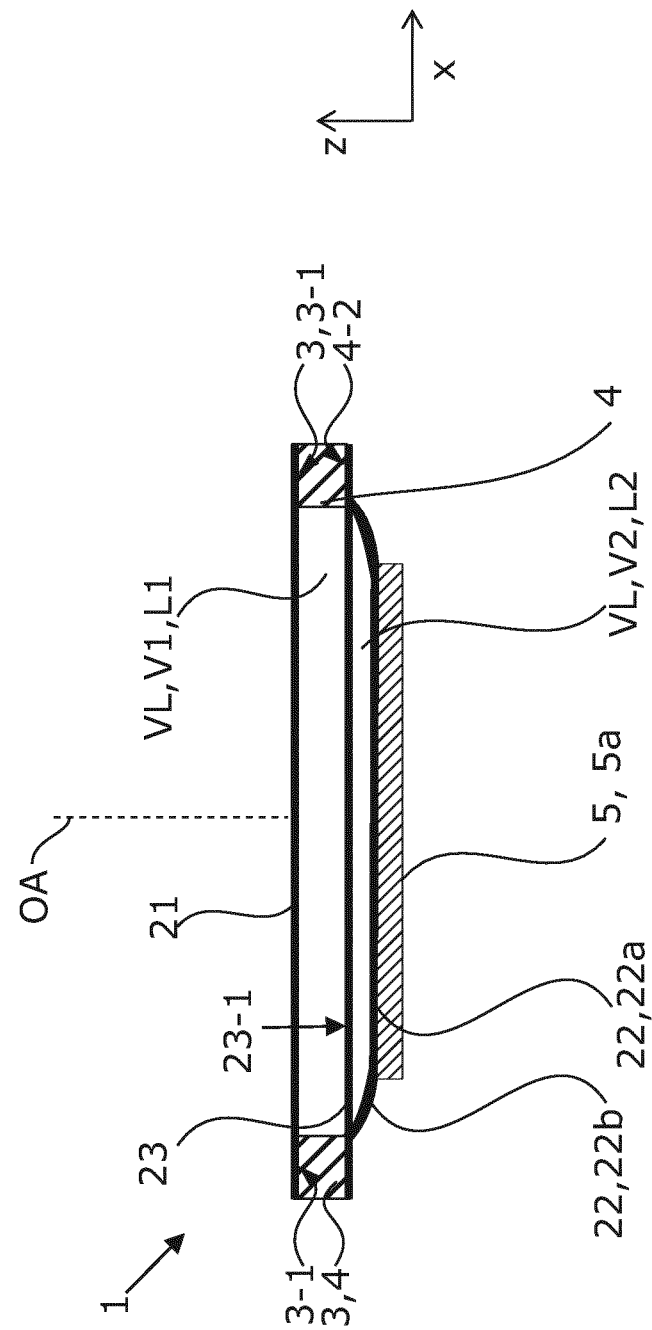
FIG. 16 shows a schematic cross-section through a lens according a sixteenth embodiment of the invention: the lens being corrected for coma aberrations.

In yet another embodiment of the invention, the lens 1 as shown in FIG. 16 comprises the first volume V1 enclosed between the first membrane 21, the cylindrical wall portion 4 that is integrally formed with the lens shaping element 3 and the third membrane 23, wherein the first membrane 21 is connected to the first side 3-1 of the lens shaping element 3 and the third membrane 23 is connected to the second side 4-2 of the wall portion 4. The second volume V2 is enclosed between the third membrane 23 and the second membrane 22 that is circumferentially connected to the third membrane 23, such that the second volume V2 has a cushion like structure. On the second side 22-2 of the second membrane 22, the window element 5 is arranged. This embodiment is structurally similar to the embodiment of FIG. 11, with the difference that the third membrane 23 is attached to the wall portion 4 rather than to the second membrane 22.

Figure 17:
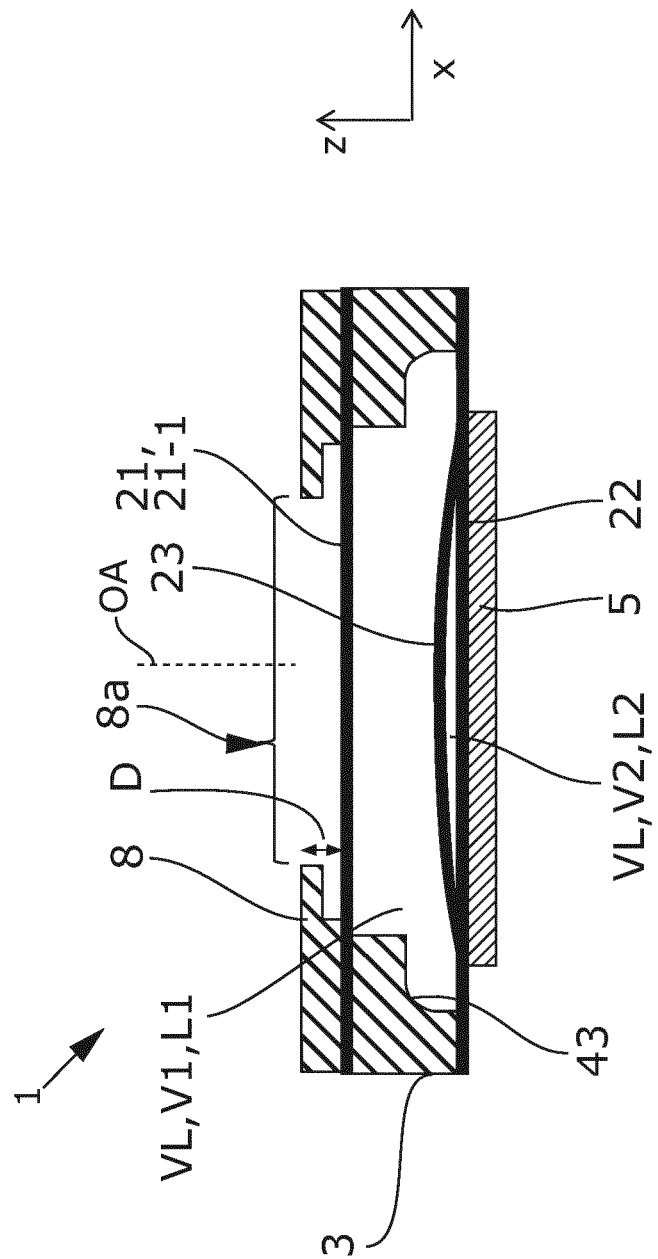
FIG. 17 shows a schematic cross-section through a lens according a seventeenth embodiment of the invention: the lens being corrected for coma aberrations.

The embodiment in FIG. 17 is a further development of the embodiment of FIG. 11. In addition to the embodiment of FIG. 11, the cross-section of the integrally formed wall portion 4 and lens shaping element 3 slightly differs from the embodiment of FIG. 11, as the step-like contour is replaced by a more continuous contour 43. The main difference, however, is that on the first side 21-1 of the first membrane 21 on the outside of the lens volume VL, an additional member 8 is connected to the lens 1 that serves as an aperture of the lens 1. The additional member 8 has a central aperture 8a that is placed at a distance D to the first membrane 21 along the optical axis OA. This allows for manufacturing a lens 1 with various sizes of apertures that can be modularly applied to the lens 1. The distance D allows the first membrane 21 to bend toward the aperture 8a of the additional member 8 without touching said aperture 8a.

Figure 18:
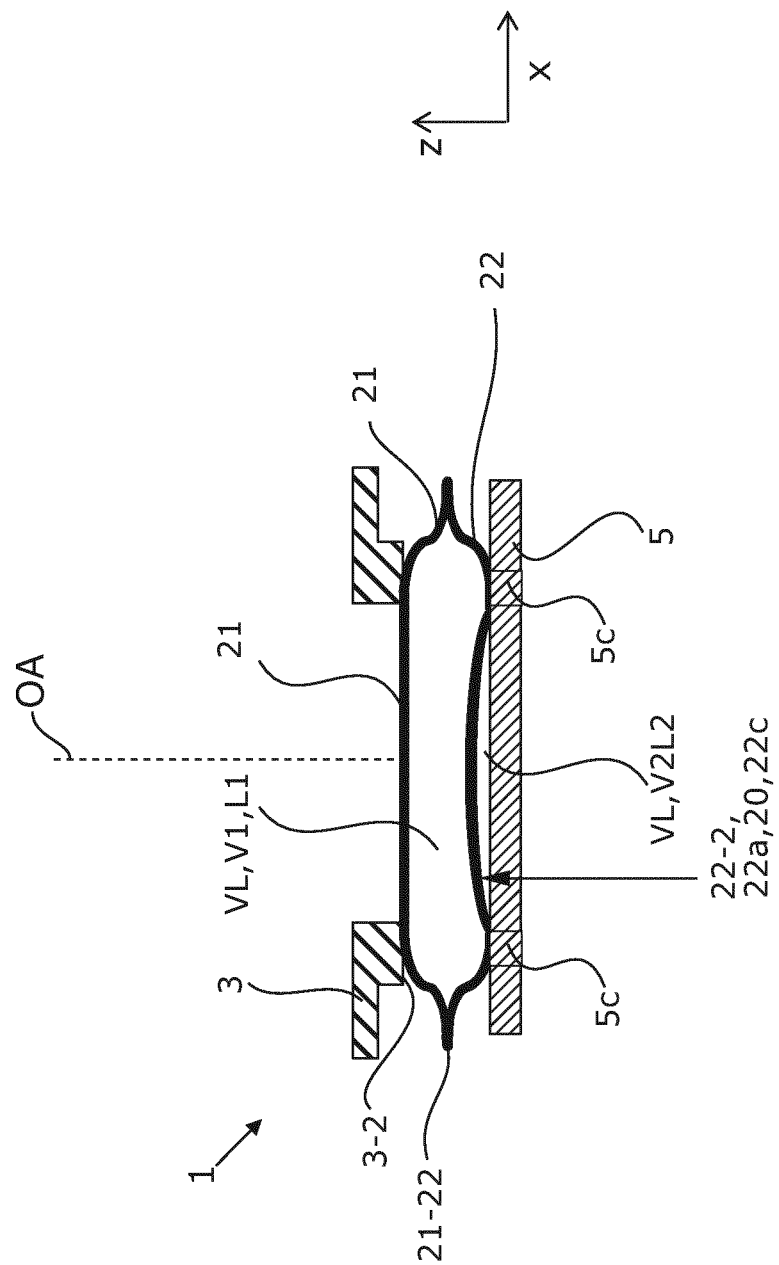
FIG. 18 shows a schematic cross-section through a lens according an eighteenth embodiment of the invention: the lens being corrected for coma aberrations and having a cushion-like lens volume.
Figure 19:
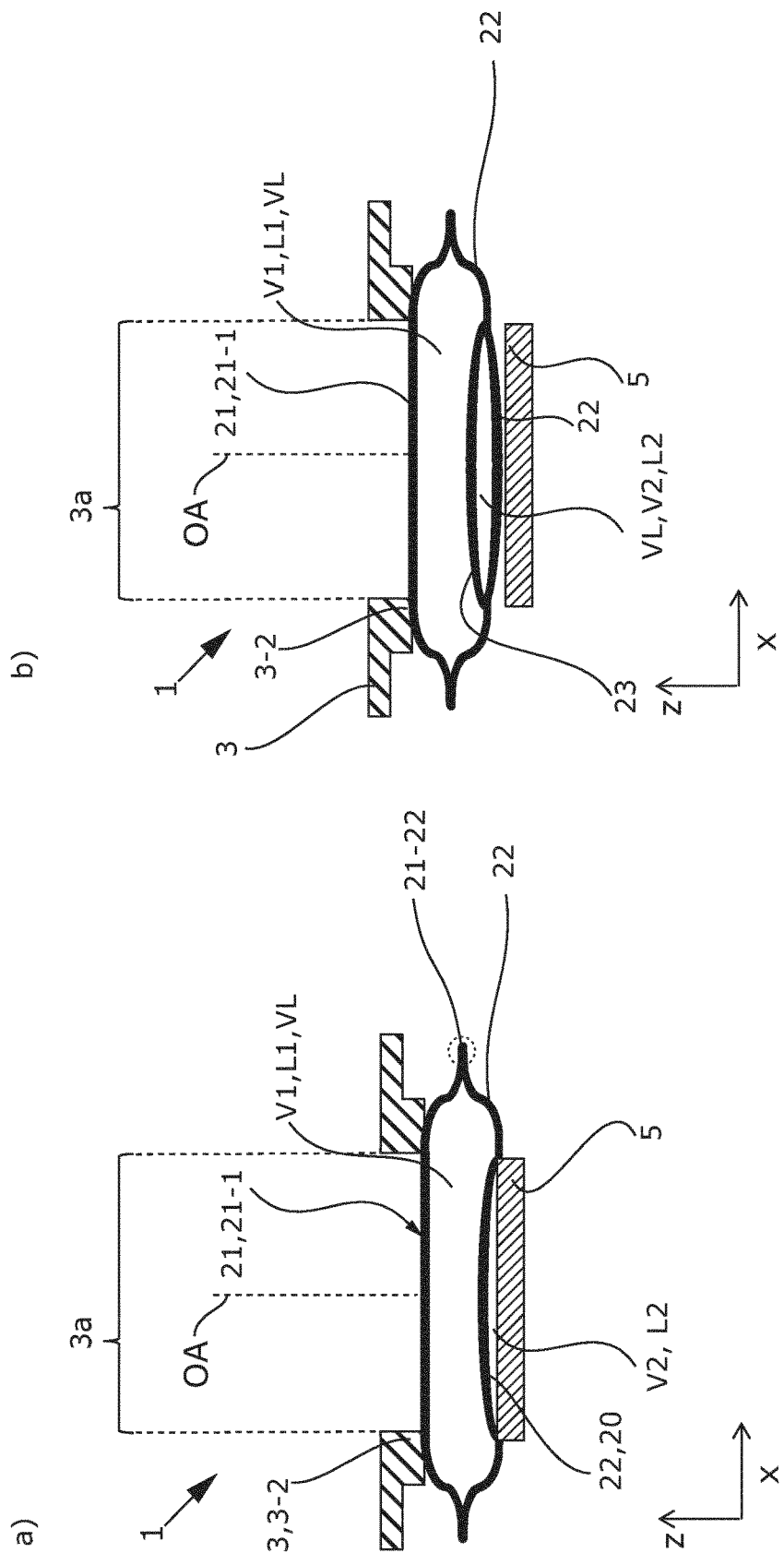
FIG. 19 shows a schematic cross-section through a lens according a nineteenth embodiment of the invention; the lens being corrected for coma aberrations and having a cushion-like lens volume.

Embodiments shown in FIG. 18 and FIG. 19 concern a lens design that allows for a particularly light-weight lens 1. The lenses 1 of FIGS. 18 and 19 are similar to the lens of FIG. 10 that discloses a pillow-like lens volume VL.

In addition to the lens of FIG. 10, the lenses 1 of FIGS. 18 and 19 each are modified to compensate acceleration-induced aberrations by having the first and the second volume V1, V2 with the first L1 and the second liquid L2. The lens volume VL comprises the first volume V1 and the second volume V2. The first volume V1 is completely enclosed by the first membrane 21 and the second membrane 22 that are sealingly connected at a circumferential 21-22 portion to the second membrane 22. The second membrane 22 is connected at a circumferential portion 5c of its second side 22-2 to the window element 5, while the window portion 22a of the second membrane 22 integrally comprises the separating membrane portion 20. Between the separating membrane portion 20 and the window element 5, the second liquid L2 is comprised in the second volume V2. This structure has been elaborated already for FIG. 12 in detail, which is applicable to FIG. 18 as well. The lens shaping element 3 is connected with a second side 3-2 to the first side 21-1 of the first membrane 21 from an outside of the lens volume VL. Any actuation of the lens 1 is provided via the window element 5, wherein the lens shaping element 3 remains at a fixed position, which allows for the advantageous effects of a fixed lens shaping element 3 as elaborated previously. For this purpose, the lens shaping element 3 protrudes radially away from the optical axis OA, such that it can be rigidly connected to a fixing member (not shown). The window element 5 can be actuated at least along the z-axis, wherein the first membrane 21, particularly the lens area 21a might change it curvature in the clear aperture 3a of the lens shaping element 3 in response to an actuation of the window element 5.

In contrast of FIG. 8, where the window element 5 extends laterally beyond the clear aperture 3a of the lens shaping element 3, which reduces stray light due to edge effects of the window element 5, such that the window element 5 is essentially invisible, the situation is different in the embodiments of FIG. 19A and FIG. 19B, where the window element 5 is smaller and does not extend beyond the clear aperture 3a of the lens shaping element 3 and more light-weight as compared to the window element of FIG. 18.

In FIG. 19, the second volume is formed by the second membrane 22 and the window element alone, wherein in FIG. 19B the second Volume is enclosed by the third membrane 23 and the second membrane alone. In both embodiments, upon actuation the second lens volume V2 essentially remains at the same size.

As elaborated in FIG. 10, the first 21 and the second membrane 22 might be two separate membranes or made of a sleeve-like membrane that is connected at the openings of the sleeve 21-22 for both embodiments FIG. 19A and FIG. 19B.

Figure 20:
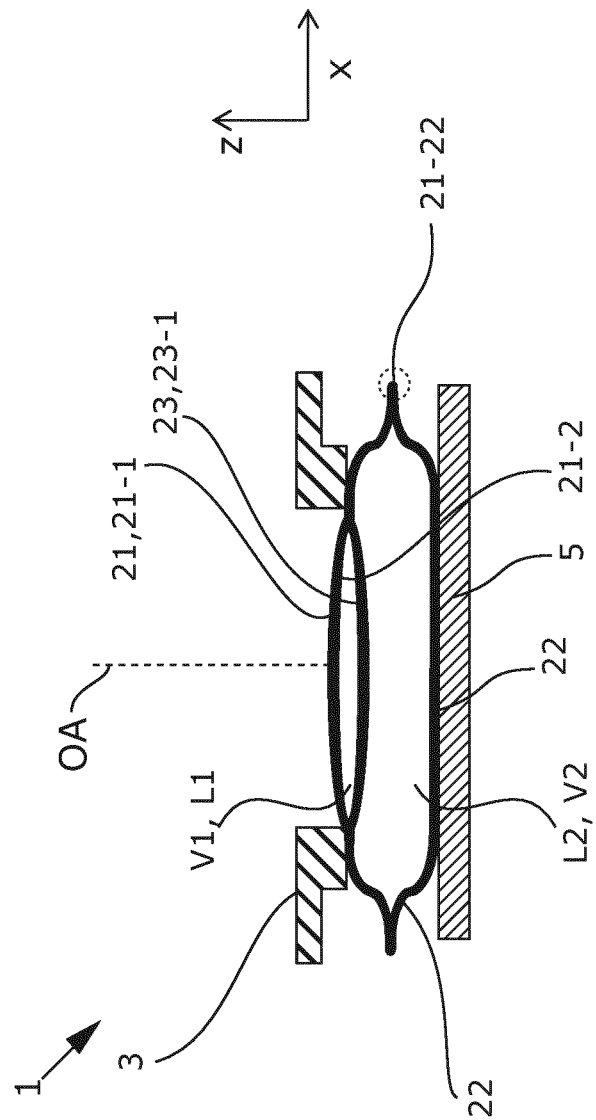
FIG. 20 shows a schematic cross-section through a lens according a twentieth embodiment of the invention; the lens being corrected for coma aberrations and having a cushion-like lens volume.

FIG. 20 shows an embodiment of a pillow-like embodiment of the lens 1 that arises from a combination of the embodiment of FIG. 14 and FIG. 10. However, the embodiment of FIG. 20, in contrast to the embodiment of FIG. 14, has a pillow-like lens volume VL formed only by the first 21 and the second membrane 22 with no solid components inside the lens volume VL. The lens 1 comprises a third membrane 23 that is connected to the first membrane 21 on an inside of the lens volume VL, i.e. the third membrane 23 is connected with its first side 23-1 to the second side 21-2 of the first membrane 21, such that the first volume V1 is formed between these membranes 21, 23. The second volume V2 is formed exclusively by the first, the second and the third membrane 21, 22, 23. Outside the lens volume VL, the lens shaping element 3 is connected to the first membrane 21 and the window element 5 is connected to the second membrane 22. Actuation is facilitated by either moving the window element 5 relative to the lens volume VL and the lens shaping element 3 that remain fixed or by moving the lens volume VL and the lens shaping element 3 (as a whole) relative to the window element 5 that remains fixed.

As can be seen in FIG. 20, the first membrane 21 adopts a convex shape in its equilibrium position (i.e. while no actuation of the window element is performed), such that the lens 1 has a refractive power in its equilibrium state. This obviously, can be applied to all embodiments of the invention. Similarly, the lens 1 could be adjusted such, that in its equilibrium position, the first membrane 21 adopts a concave shape. Both equilibrium states can be achieved by adjusting a pressure of the first liquid L1 inside the lens volume VL.

Figure 21:
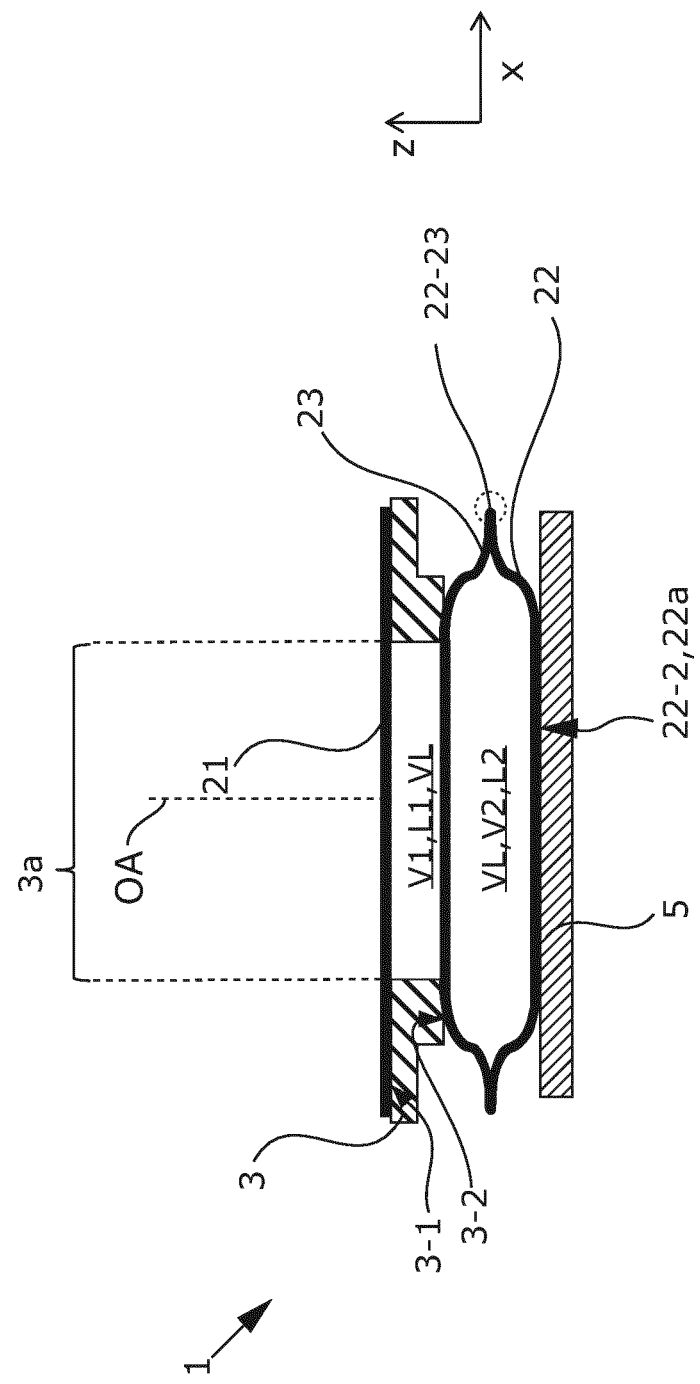
FIG. 21 shows a schematic cross-section through a lens according a twenty-first embodiment of the invention; the lens being corrected for coma aberrations and having a cushion-like lens volume.

FIG. 21 discloses a lens 1 that is configured to compensate acceleration-induced aberrations as the lenses of previous figures.

Here, the lens volume VL is formed by a pillow-like second lens volume V2 that is exclusively formed by the second 22 and the third membrane 23 with no rigid components on its inside. At its rim portions 22-23 the third 23 and the second membrane 22 are sealingly connected to seal the second liquid L2 in the second volume V2.

The first lens volume V1 is enclosed by the third membrane 23, the lens shaping element 3 and the first membrane 21.

The lens shaping element 3 is connected with the first side 3-1 to the first membrane 21 and with its second side 3-2 to the third membrane 23.

The lens shaping element 3 protrudes radially away from the clear aperture 3a, such that a fixing member (not shown) may be connected to the lens shaping element 3.

The window element 5 is connected to the second side 22-2 of the second membrane 22 via the window portion 22a of the second membrane 22 to the second membrane 22.

FIGS. 22 to 25 focus on actuation assemblies for the lenses according to the invention. While the embodiments only show lenses without acceleration-induced aberration compensation, it is noted that also embodiments having the lens volume VL separated in the first V1 and the second volume V2 for acceleration-compensation can be equipped with the actuation assemblies in the same manner.

The common design of the actuation assemblies shown in FIG. 22 to FIG. 25 is that the actuation coils 9 are arranged movable relative to the lens shaping element 3.

In FIGS. 22 to 25, at the window element 5, the actuation element 6 extends laterally away from the window element 5 such that it protrudes beyond the wall portion 4 of the lens 1. In terms of a three-dimensional view, this might be by means of separate protruding arm members 6a or by means of a ring- or disc-like structure 6a. This lateral protruding member is also referred to as the lateral mover element portion 6a in the context of the current specification. As elaborated for previous embodiments the actuation element 6 might comprise damping elements (not shown). The actuation element 6 can also serve as an aperture for the lens 1 as shown in FIG. 22 to FIG. 25, limiting the aperture of the lens 1 on the side of the window element 5.

At an outer portion 6d of the protruding member 6a that lies laterally beyond the wall portion 4, a coil portion 6e is arranged, wherein said coil portion 6e comprises one or more coils 9. Typically, four or more coils 9 are arranged on the protruding member 6a circumferentially around the wall portion 4. In FIGS. 22 to 25 only two coils 9 can be seen. The coils 9 extend with their coil axes essentially parallel to the optical axis OA of the lens 1, when in equilibrium state. Correspondingly to the coils 9, the lens 1 comprises magnetic portions 10, particularly comprising a permanent magnet 10, particularly in form of a permanent ring magnet or a plurality of separate magnets. The magnetic portions 10 are rigidly connected to the wall portion 4 on an outside of the lens volume VL that faces the coils 9. As such the coils 9 are arranged opposite the corresponding magnetic portions 10 on the outside of the lens volume. Between the coils 9 and the magnetic portions 10 a predefined lateral distance or air gap 50 is provided, such that the coils 9 are free to move and tilt to some extent relative to the magnetic portions 10. The magnetic poles N, S of the magnetic portions 10 are arranged in a radial or lateral fashion with respect to the optical axis OA, such that the magnetic dipole vector is oriented essentially orthogonal to the coil axes. The coils 9 overlap along the optical axis OA at least partially with the magnetic portions 10. With the coil axes and the magnetic poles oriented and positioned as described, actuation of the window element 5 relative to the wall portion 4 and thus the lens shaping element 3 becomes possible by means of a Lorentz force. Therefore, by providing appropriate electrical currents to the coils 9 virtually any movement of the window element 5 relative to the lens shaping element 3 can be achieved.

The coils 9 can be wound around a solid axis of the coil portion (not shown).

The advantage of this actuation assembly is that is less susceptible to external magnetic fields as compared to reluctance-based actuation assemblies.

Figure 22:
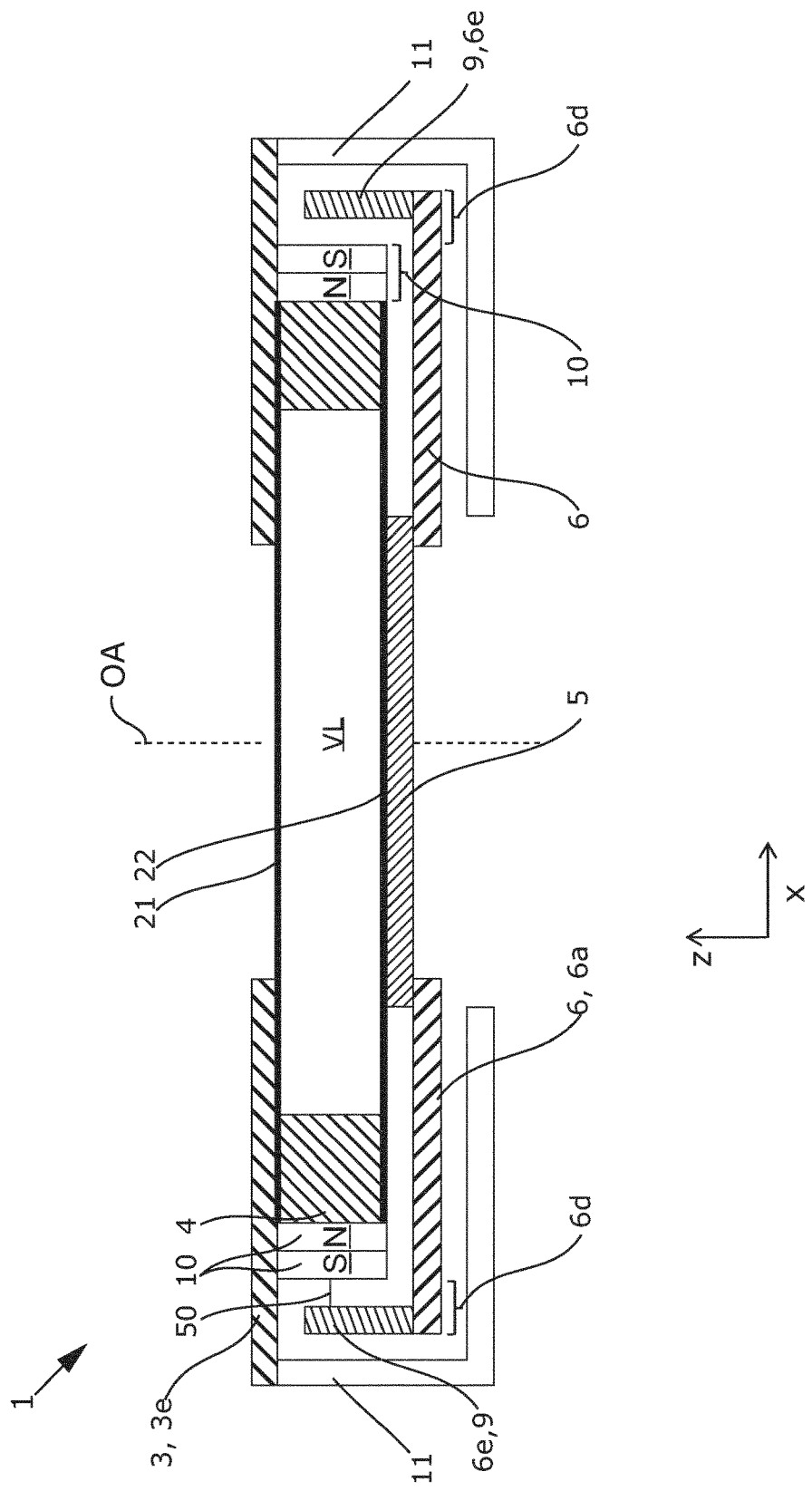
FIG. 22 shows a schematic cross-section through a lens with actuation elements according a twenty-second embodiment of the invention.

The embodiment of FIG. 22 further comprises a silicon lens shaping element 3 that extends laterally beyond the wall portion 4 and the lens volume VL, such that it provides a hard stop for the coil motion along the optical axis. Further, a hard stop portion 11 is connected to the lens shaping element 3 at an outer portion 3e of the lens shaping element 3, wherein said hard stop portion 11 extends in a housing-like fashion around the coil portion and the protruding member 6d of the actuation element 6, such that a hard stop is provided also to the actuation element 6 from the other side of the lens 1.

The two hard stops limit the range of the coil motion along the optical axis OA in both directions such that accidental overdrives or shock-induced motions will do no harm to the actuation assembly.

Figure 23:
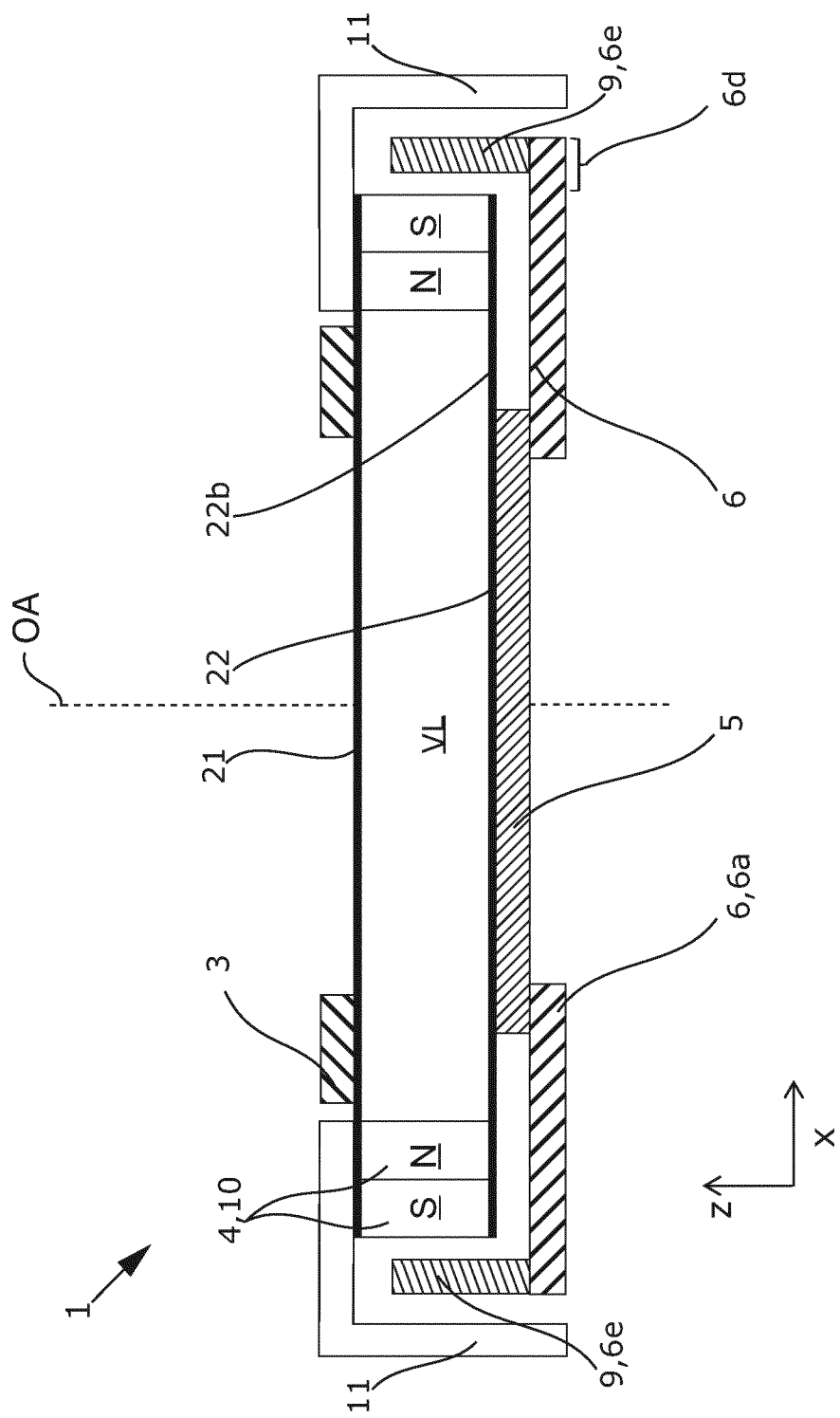
FIG. 23 shows a schematic cross-section through a lens with actuation elements and magnets according a twenty-third embodiment of the invention.

In FIG. 23 the lens shaping element 3 is floatingly arranged on the first membrane 21, i.e. it is not in rigid contact with the wall portion 4.

In the embodiment of FIG. 23, the wall portion 4 consists of the magnetic portions 10, which reduces the assembly complexity of the lens 1.

The lens 1 comprises a separate hard stop portion 11 that is configured to limit the movement of the coils 9 toward the side of the lens 1, where the lens shaping element 3 is located.

Figure 24:
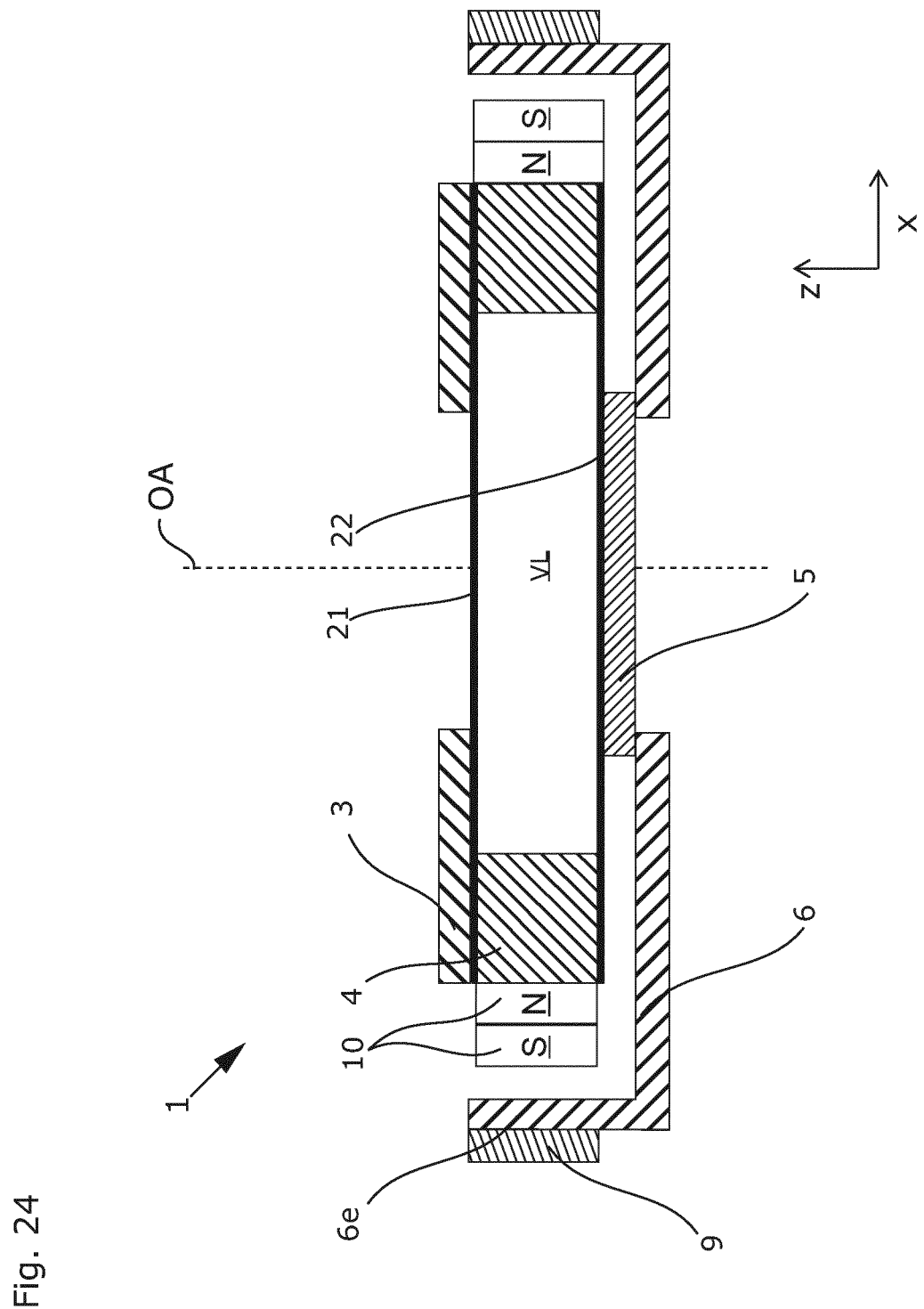
FIG. 24 shows a schematic cross-section through a lens with actuation elements and magnets according a twenty-fourth embodiment of the invention.

In FIG. 24 a very similar embodiment as in FIG. 22 is shown, however without any hard stop portions or housing-like features.

In contrast to FIG. 22, the coils 9 are attached to a rigid coil portion 6e and not wound around an axis of the coil portion 6e.

Figure 25:
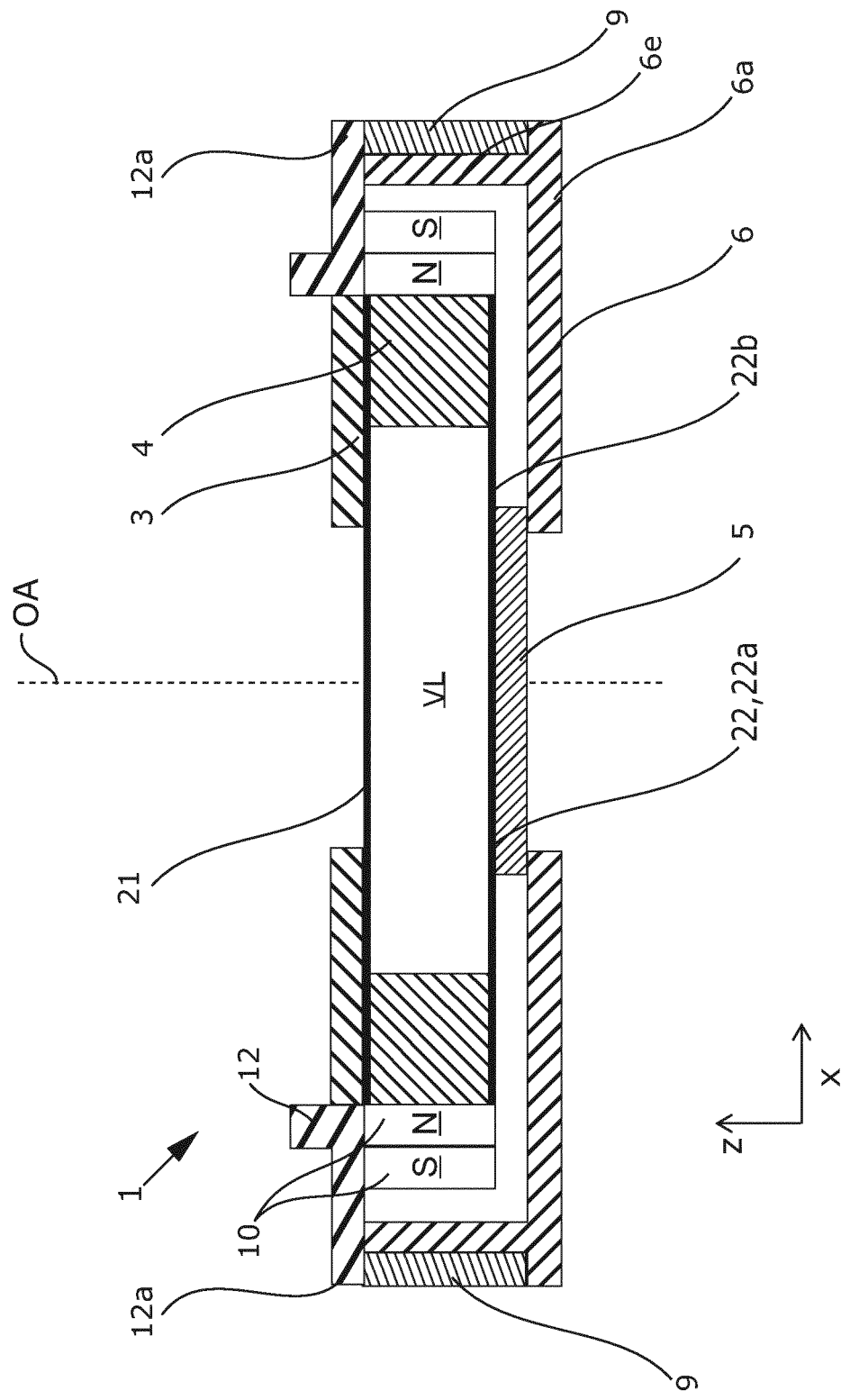
FIG. 25 shows a schematic cross-section through a lens with actuation elements and magnets according a twenty-fifth embodiment of the invention.

In FIG. 25, an example is shown that illustrates an electric contacting of the coils 9. For this purpose, for each coil 9 a contacting member 12 is arranged on the first side (i.e. the side of the lens 1 on which the first membrane 21 is arranged) of the lens 1. The contacting members 12 comprise a spring-like member 12a that physically connects the coils 9 with the wall portion 4 and the magnetic portions 10 on a side of the coils 9 that faces away from the protruding member 6a. The spring-like members 12a provide a restoring force, while at the same time said members 12a are configured to provide electricity to the coils 9 for controlling orientation and position of the window element 5 and thus, the refractive power of the lens 1.

The spring like members 12a might be formed as leaf springs.

Figure 26:
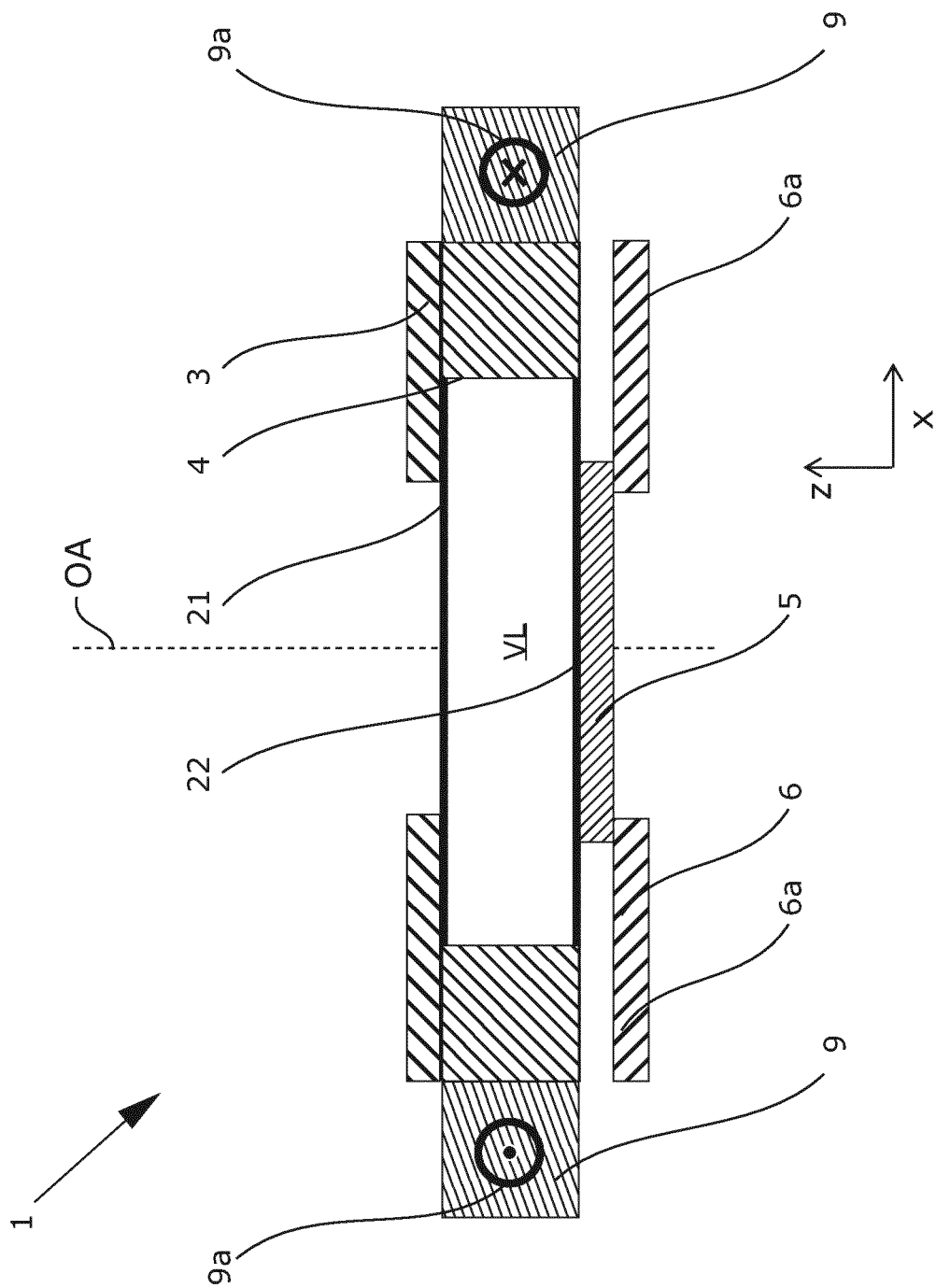
FIG. 26 shows a schematic cross-section through a lens with a reluctance drive according a twenty-sixth embodiment of the invention.
Figure 27:
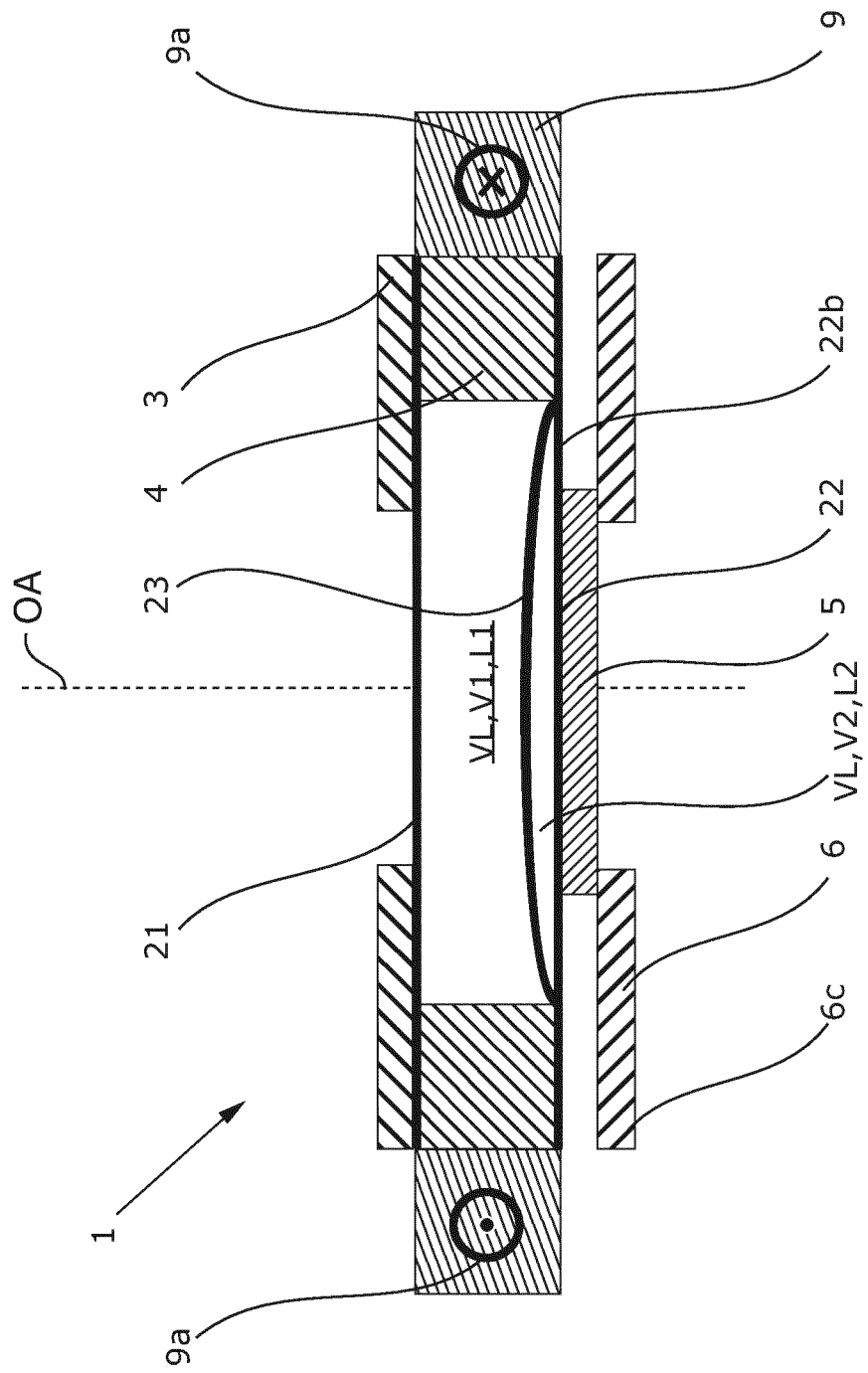
FIG. 27 shows a schematic cross-section through a lens with a reluctance drive and coma-compensation according a twenty-seventh embodiment of the invention.

In FIGS. 26 and 27 a different actuation assembly is shown. The actuation is based on a reluctance drive.

For this purpose, the coils 9 are arranged fixedly at the wall portion of the lens 1, with an orientation of the coil axes pointing along the lateral plane (in the angular direction of the lens into the drawing plane or outwards the pane of drawing) extending orthogonal to the optical axis 9a of the lens 1. The wall portion 4 is made of a metal compound, such as iron. Similarly, the actuation element 6, particularly the protruding portion of the actuation element 6 comprises or consists of a metal compound such as iron.

An electrically conducting material may be used instead of the metal compound.

When an electrical current is applied to the coils 9 a reluctance force is induced in the protruding member 6a of the actuation element 6, such that the position and orientation of the window element 5 can be controlled. The wall portion 4 amplifies said force up to a factor 1000. As elaborated previously, the design of the lens 1 with regard to the arrangement of the lens shaping element 3, the membranes 21, 22 (and particularly 20, 23) etc. can be adapted to previous embodiments in a similar fashion.

An example for the adaption of the embodiment of FIG. 26 to a lens configured to compensate acceleration-induced aberrations is given in FIG. 27.

The lens of FIG. 27 essentially corresponds to the lens 1 of FIGS. 11 and/or 12. In addition the lens of FIG. 27 comprises the actuation assembly laid out in FIG. 26.

The reluctance-based actuation provides a very compact lens design.

Figure 28:
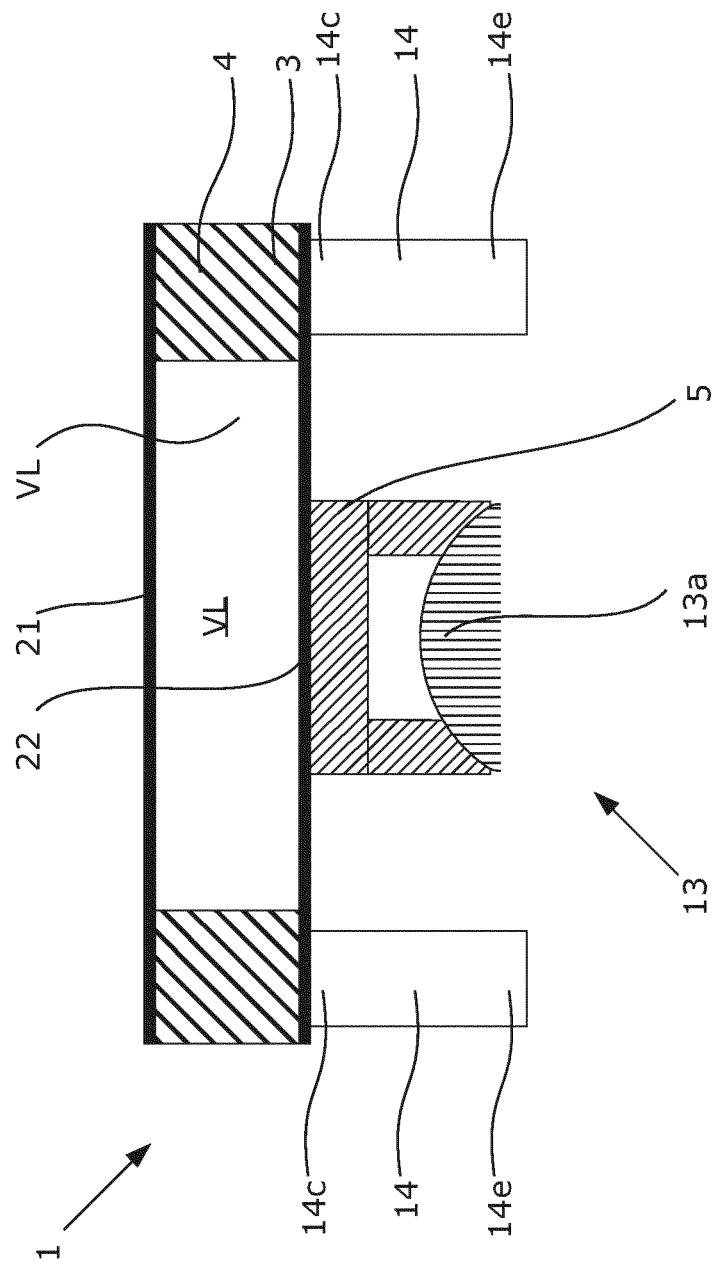
FIG. 28 shows a schematic cross-section through a lens with an additional optics assembly according a twenty-eighth embodiment of the invention.

In FIG. 28 an example is shown in which the lens shaping element 3 in combination with the lens volume VL might be moved relative to the window element 5 as part of an optical system 100.

The lens 1 of FIG. 28 comprises an additional optics assembly 13 comprising a further lens 13a that might be glued to the window element 5. The lens volume VL is enclosed by the first and the second membrane 21, 22 and the wall portion 4 that is integrally formed with the lens shaping element 3 (similar to FIG. 2).

The window element 5 together with the optics assembly 13 is rigidly attached to some fixing member (not shown) that does not move, and might be connected to a housing of the lens. In order to adjust the refractive power of the lens 1, an actuator 14, e.g. a piezo actuator, is connected to the lens body comprising the lens volume VL, the first and the second membrane 21, 22 and the lens shaping element 3. The actuator 14 might be rigidly connected with an end portion 14e to a fixing member (not shown) and with a connecting portion 14c to the lens body.

The lens body can be displaced relative to the window element 5, by providing an actuation force generated by the actuator 14, such that lens body is displaced relative to the window element 5. This way, a relative movement of the window element 5 with respect to the lens shaping element 3 is achieved, while the lens shaping element 3 does not move relative to the wall portion 4, the first and the second membrane 21, 22, i.e. relative to the lens body.

Figure 29:
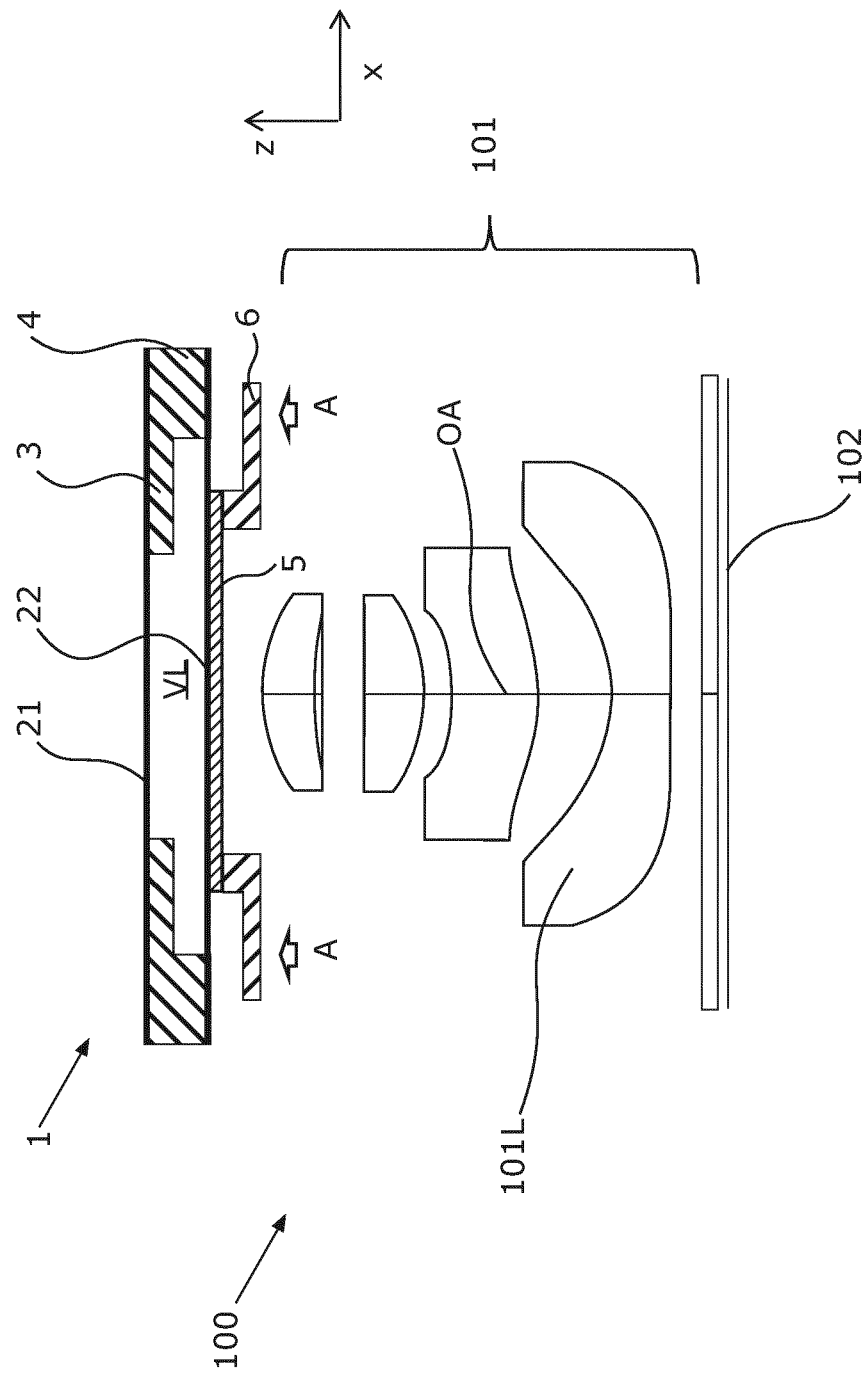
FIG. 29 shows a schematic cross-section through a lens with an additional optics assembly according a twenty-ninth embodiment of the invention.

In FIGS. 29 to 30, various embodiment of an optical system 100 comprising an optical sensor in form of an array detector 102, such as a camera that is arranged on an optical axis of the system 100 that corresponds to the optical axis OA of the lens 1. The system further comprises an optical assembly 101 comprising at least one hard lens 101L.

In FIG. 29, the lens 1 and the optical assembly 101 are arranged at a fixed distance to each other while the lens 1 is located on an side of the system where the light is enters the system, i.e. the lens 1 that has the largest distance to the array detector 102.

The lens 1 might provide focusing of an image to the array detector 102.

In FIG. 30A, the system 100 comprises two lens assemblies 110, 120, wherein between the lens assemblies 110, 120 the lens 1 according to the invention is located. This way, the lens 1 might be used for a zoom function of the optical system 100. In FIG. 30A the lens 1 faces with its first membrane 21 toward the array detector 102, wherein in FIG. 30B the lens 1 faces with its first membrane away from the detector 102.

The lens 1 might provide optical image stabilization, e.g. by means of tilting the window element 5 accordingly, or superresolution imaging, also by way of tilting the window assembly, such that the induced prism of the lens 1 projects the image onto different portion on the array detector 102 in the latter case.

In FIG. 31A and FIG. 31B a two three-dimensional views of the lens 1 according to the invention are shown. In FIG. 31A, the lens shaping element 3 has a circular, disc-like shape, wherein in FIG. 31B the lens shaping element 3 has additional protrusions that can be used for attaching and orienting the lens shaping element to external fixing elements (not shown).

In both Figures FIG. 31A and FIG. 31B, the window element 5 is connected to the actuation element 6 that comprises a plurality of protruding members 6a to which an actuator might be connected.

Figure 32:
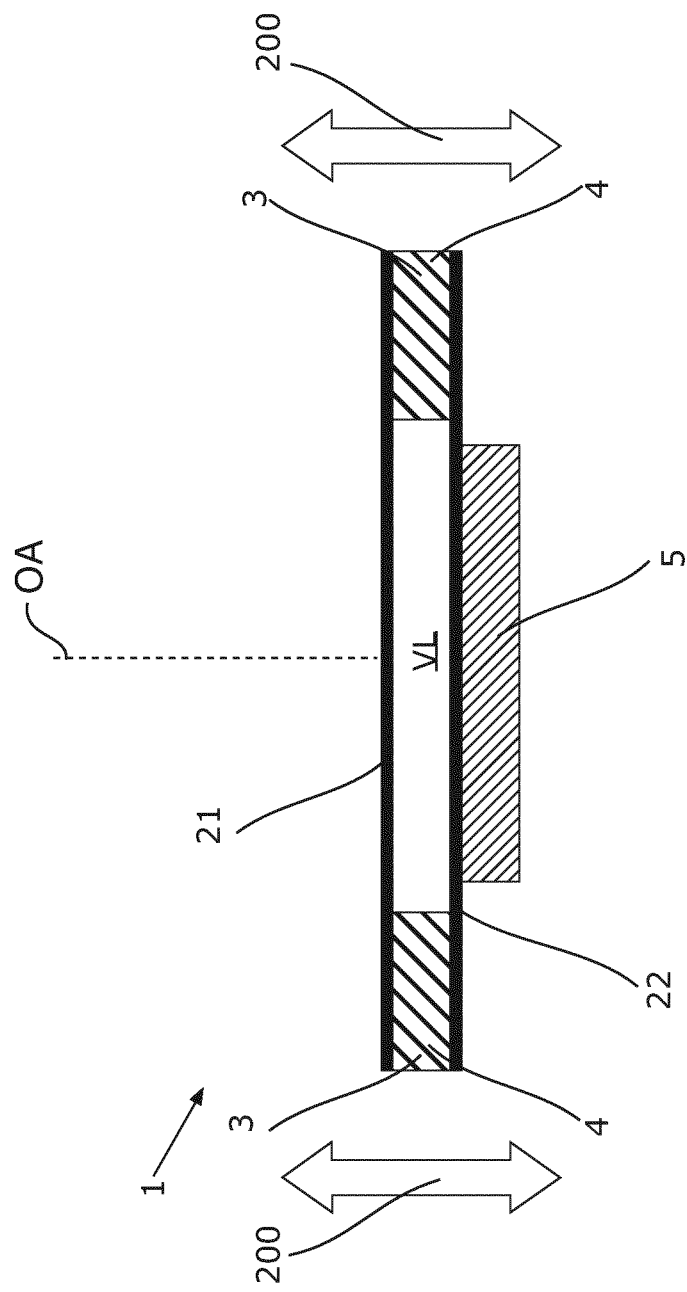
FIG. 32 shows a cross-sectional view of a lens according to an embodiment of the invention.

In FIG. 32 an example of the lens is shown that demonstrates that a relative movement of the window element 5 relative to the lens body or the lens shaping element 3 may be achieved by either by actuating the window element 5 actively and having the lens shaping element with the lens body fixed relative to the window element or by actuating the lens shaping element or the lens body actively and having the window element 5 fixed relative to the lens shaping element or the lens body. Both actuation methods provide the desired advantages of the lens novel lens design according to the invention.

The double arrow 200 indicates exemplary actuation directions.

The invention claimed is:

1. A liquid lens with an adjustable optical power comprising at least the following components: a lens volume (VL) with a first transparent liquid (L1) arranged between a first transparent membrane and a second transparent membrane opposite the first membrane,
wherein the first membrane has a first side facing outwards the lens volume (VL) and a second side facing in the opposite direction, a lens shaping element arranged on the first membrane, wherein the lens shaping element has a circumferential aperture defining a lens area of the first membrane having an adjustable curvature,
wherein the second membrane has a first side facing toward the lens shaping element and a second side facing in the opposite direction, a rigid transparent window element connected to the second membrane, wherein the window element is circumferentially surrounded by a free portion of the second membrane, such that the window element can be moved relatively to the lens shaping element,
wherein the lens volume (VL) forms or comprises a first volume (V1) comprising the first liquid (L1), and
the lens comprises a second liquid (L2) in a second volume (V2), wherein the second volume (V2) is arranged at least partially on the optical axis (OA) of the lens, particularly along the z-axis of the lens, wherein the first liquid (L1) and the second liquid (L2) as well as the first volume (V1) and the second volume (V2) are separated from each other by a separating membrane portion.

2. The lens according to claim 1, wherein the lens volume (VL) is enclosed by the first and the second membrane only, wherein the first and the second membrane are connected in a sealing fashion to each other such as to form the lens volume (VL), particularly wherein the first and the second membrane are connected circumferentially at a lateral portion of the lens volume (VL), particularly wherein the lateral portion extends circumferentially around the lens area of the first membrane and circumferentially around the free portion of the second membrane.

3. The lens according to claim 2, wherein the first membrane and the second membrane are integrally formed in form of a membrane sleeve that is sealingly connected at the openings of the membrane sleeve.

4. The lens according to the claim 1, wherein the second liquid (L2) is arranged and sealed between the window element and the second membrane, thereby enclosing the second liquid (L2) between an integral portion of the second membrane and the window element.

5. The lens according to claim 1, wherein the separating membrane portion is comprised by a third membrane, wherein the third membrane has a first side and a second side, wherein the second side of the third membrane faces in the opposite direction than the first side of the third membrane, wherein the first liquid (L1) is arranged between the first membrane and the third membrane, and the second liquid (L2) is arranged between the third membrane and the second membrane.

6. The lens according to claim 1, wherein the second volume (V2) is comprised by the lens volume (VL).

7. The lens according to claim 1, wherein the second volume (V2) is enclosed, particularly completely formed and enclosed by the third membrane and the second membrane.

8. The lens according to claim 5, wherein the third membrane is circumferentially connected with its second side to the first side of the second membrane.

9. The lens according to claim 5, wherein the third membrane is connected to the lens shaping element.

10. The lens according to claim 9, wherein the first membrane is connected to the first side of the lens shaping element and wherein the third membrane is connected to the second side of the lens shaping element, such that the first volume (V1) is enclosed in the circumferential aperture of the lens shaping element.

11. The lens according to claim 5, wherein the third membrane is circumferentially connected to the first membrane and the first volume (V1) is formed between the first membrane and the third membrane, wherein the third membrane is connected with its first side to the second side of the first membrane and wherein the third membrane is connected with its first side to the second side of the first membrane.

12. The lens according to claim 1, wherein the first liquid (L1) has a first refractive index (n1)^ and the second liquid (L2) has a second refractive index (n2), wherein the first and the second refractive index are different from each other.

13. The lens according to claim 12, wherein a composition of the first liquid (L1) and the second liquid (L2), the curvature of the membranes delimiting the first volume (V1) and the second volume (V2) are selected such that temperature-induced changes of the first volume (V1) with the first liquid (L1) and the second volume (V2) with the second liquid (L2) and temperature-induced changes of the first and the second refractive index (n1, n2) of the first and the second liquid (L1, L2) are compensated, whereby the optical power of the lens remains essentially constant for different temperatures.

14. The lens according to claim 12, wherein the first liquid (L1) has a first mass density (p1)^ and the second liquid (L2) has second mass density (p2), wherein the first and the second refractive index (n1^, n2) of the first and the second liquid (L1, L2) as well as the first and the second mass density (p1, p2) are selected such that an acceleration-induced aberration of the lens, such as gravity coma or posture effects induced by orienting the lens along different directions with respect to gravity, is compensated.

15. The lens according to claim 14, wherein the second mass density (p2) of the second liquid (L2) is higher than the first mass density (p1) of the first liquid (L1), and the second refractive index (n2) is smaller than the first refractive index (n1)ˆ of the first liquid (L1).

16. The lens according to claim 14, wherein the first membrane has a first stiffness (k1) and the separating membrane portion, particularly the third membrane has a separating membrane portion stiffness (ks), particularly wherein a thickness of the first membrane and the thickness of the separating membrane portion are essentially equal, wherein the first stiffness and the separating membrane portion stiffness ks are selected according to the relation n1-n2 p2-p1 wherein p1 is the first mass density of the first liquid (L1), p2 is the second mass density of the second liquid (L2), n1 is the first refractive index of the first liquid (L1) and n2 is the second refractive index of the second liquid (L2).

17. The lens according to claim 1, wherein the lens comprises an actuation element connected to the window element, wherein the actuation element comprises a spring element such that an actuation force provided to the window element is transmitted via the spring element, particularly wherein the spring element is formed as an elastic metal sheet that extends essentially parallel to the window element.

18. The lens according to claim 1, wherein the first membrane has a first stiffness k-t and the second membrane has a second stiffness k2, wherein the second stiffness k2 \s smaller than the first stiffness k1, and/or wherein the first membrane has a first thickness t1 and the second membrane has a second thickness t2, wherein the second thickness t2 is smaller than the first thickness t.

19. The lens according to claim 1, wherein the lens is configured to be changed from a negative to a positive lens upon actuation and/or wherein the lens is configured to be changed from a positive lens to a negative lens upon actuation.

20. A liquid lens with an adjustable optical power comprising at least the following components: a lens volume (VL) with a first transparent liquid (L1) arranged between a first transparent membrane and a second transparent membrane opposite the first membrane, wherein the first membrane has a first side facing outwards the lens volume (VL) and a second side facing in the opposite direction, a lens shaping element arranged on the first membrane, wherein the lens shaping element has a circumferential aperture defining a lens area of the first membrane having an adjustable curvature, wherein the second membrane has a first side facing toward the lens shaping element and a second side facing in the opposite direction, a rigid transparent window element connected to the second membrane, wherein the window element is circumferentially surrounded by a free portion of the second membrane, such that the window element can be moved relatively to the lens shaping element, wherein the lens volume (VL) is enclosed by the first and the second membrane only, wherein the first and the second membrane are connected in a sealing fashion to each other such as to form the lens volume (VL), particularly wherein the first and the second membrane are connected circumferentially at a lateral portion of the lens volume (VL), particularly wherein the lateral portion extends circumferentially around the lens area of the first membrane and circumferentially around the free portion of the second membrane.

* * * * *